United States Patent
Matthew et al.

(10) Patent No.: US 9,672,023 B2
(45) Date of Patent: Jun. 6, 2017

(54) PROVIDING A UNIFIED UPDATE CENTER FOR SECURITY SOFTWARE UPDATES AND APPLICATION SOFTWARE UPDATES

(71) Applicant: Apple Inc., Cupertino, CA (US)

(72) Inventors: Jack R. Matthew, San Francisco, CA (US); Jean-Pierre Ciudad, San Francisco, CA (US); Laurent Baumann, Campbell, CA (US); Patrick L. Coffman, San Francisco, CA (US); Randy D. Saldinger, San Jose, CA (US); Daniel I. Feldman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 312 days.

(21) Appl. No.: 13/841,810

(22) Filed: Mar. 15, 2013

(65) Prior Publication Data

US 2014/0282480 A1 Sep. 18, 2014

(51) Int. Cl.
  *G06F 9/44* (2006.01)
  *G06F 9/445* (2006.01)

(52) U.S. Cl.
  CPC . *G06F 8/65* (2013.01); *G06F 8/60* (2013.01)

(58) Field of Classification Search
  USPC .......................................... 717/172
  See application file for complete search history.

(56) References Cited

U.S. PATENT DOCUMENTS

| | | |
|---|---|---|
| 2002/0184619 A1 | 12/2002 | Meyerson |
| 2004/0003266 A1* | 1/2004 | Moshir et al. ............... 713/191 |
| 2004/0040021 A1* | 2/2004 | Bharati et al. ............... 717/170 |

(Continued)

FOREIGN PATENT DOCUMENTS

| | | |
|---|---|---|
| WO | PCT/US2013/077725 | 12/2013 |
| WO | PCT/US2013/077725 | 3/2014 |

OTHER PUBLICATIONS

Internet article(Download Offline Hotfixes and Patches with Windows Updates Downloader, dated 2012, retrieved on Apr. 8, 2015, URL: https://www.raymond.cc/blog/windows-updates-downloader/).*

(Continued)

*Primary Examiner* — Hang Pan
(74) *Attorney, Agent, or Firm* — Morgan, Lewis & Bockius LLP

(57) ABSTRACT

A graphical user interface (GUI) for a unified software update display center is provided. The GUI includes a first display area for displaying a set of available security system software updates. The GUI includes a second display area for displaying a set of available non-security system software updates. The GUI includes a third display area for displaying a set of available application software updates. The GUI includes a single selection tool for installing all available security updates without installing any updates displayed in the second and third display areas. The GUI includes individual selection tools for installing individual updates displayed in the second and third display areas. The GUI includes a selection tool to receive further updates from a system update server and an application update server. The critical security updates are displayed with different display attributes or in different sections to distinguish them from other types of updates.

23 Claims, 20 Drawing Sheets

(56) References Cited

U.S. PATENT DOCUMENTS

| | | | | |
|---|---|---|---|---|
| 2004/0061713 A1* | 4/2004 | Jennings | ................ | 345/700 |
| 2004/0181787 A1* | 9/2004 | Wickham | ................ | G06F 8/65 |
| | | | | 717/168 |
| 2005/0246658 A1* | 11/2005 | Uemura et al. | ................ | 715/805 |
| 2007/0006219 A1* | 1/2007 | Sinha | ................ | G06F 8/61 |
| | | | | 717/174 |
| 2012/0144382 A1 | 6/2012 | Matthew et al. | | |
| 2014/0047425 A1* | 2/2014 | Thapar | ................ | G06F 8/65 |
| | | | | 717/168 |

OTHER PUBLICATIONS

U.S. Appl. No. 13/841,905, filed Mar. 15, 2013, Apple Inc.
Author Unknown, "Simple package management with Synaptic Package Manager in Ubuntu", Nov. 16, 2006, 22 pages, available at http://www.debianadmin.com/simple-package-management-with-synaptic-package-manager-in-ubuntu.html.
International Preliminary Report on Patentability, Sep. 15, 2015, received in International Patent Application No. PCT/US2013/077725, which corresponds with U.S. Appl. No. 13/841,810, 7 pages.

* cited by examiner

PROVIDING A UNIFIED UPDATE CENTER FOR SECURITY SOFTWARE UPDATES AND APPLICATION SOFTWARE UPDATES

BACKGROUND

Software update is a mechanism to notify users that updates are available for an electronic device. If automatic checking for updates area allowed on a device, the user gets an alert on the screen when there are updates available. The user can either install an update using the alert or request to see more details. The request to see more details opens a window provides more details about the update. Alternatively, the user can manually check for available software updates.

Since updates come from different sources such as the operating system vendor and different application vendors, there are different user interfaces to show different updates, which cause users confusion. In addition, software update authors do not have a uniform way of providing, critical security updates to a user device, communicating the urgency of the updates, and streamlining the installation of these updates.

BRIEF SUMMARY

Some embodiments provide a unified software update center to display all available software updates including security updates, non-security system software updates, and application software updates. The unified software update center also provides tools for checking for more updates and installing individual or groups of updates. Security updates are shown as a separate list of items in the update center screen to differentiate the security updates from other software updates. In some embodiments, a subset of security updates is identified as critical security updates. In other embodiments, all security updates are treated as critical updates. In all these embodiments, the critical security updates (being all security updates or a subset that are identified as critical updates) are treated with more urgency than other updates.

The availability of critical security updates is checked more often than other updates. The critical security updates are notified to the user more frequently than other updates in some embodiments. The critical updates are displayed or announced more prominently (e.g., with different colors, fonts, icons, sounds, etc.) than other updates. Also, depending on the user preferences and whether an update requires restarts, some critical security updates are automatically installed on the client device.

In some embodiments, security updates include additional associated metadata that facilitate the urgent treatment of these updates. When a client device sends the identification (or list) of system software installed in the device to a system software update server, the system software update server provides a list of updates that are available for the system software currently installed on the device. This list includes metadata that are associated with the updates.

The metadata for an update include title, subtitle or text of the update, a countdown to auto install, an indication whether the update is critical, an indication whether the update requires restart, title and text for post install notification, etc. The metadata information is used to generate notification and post installation strings, determine whether an update has to be installed immediately or with a delay, determine whether a restart is needed, etc.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
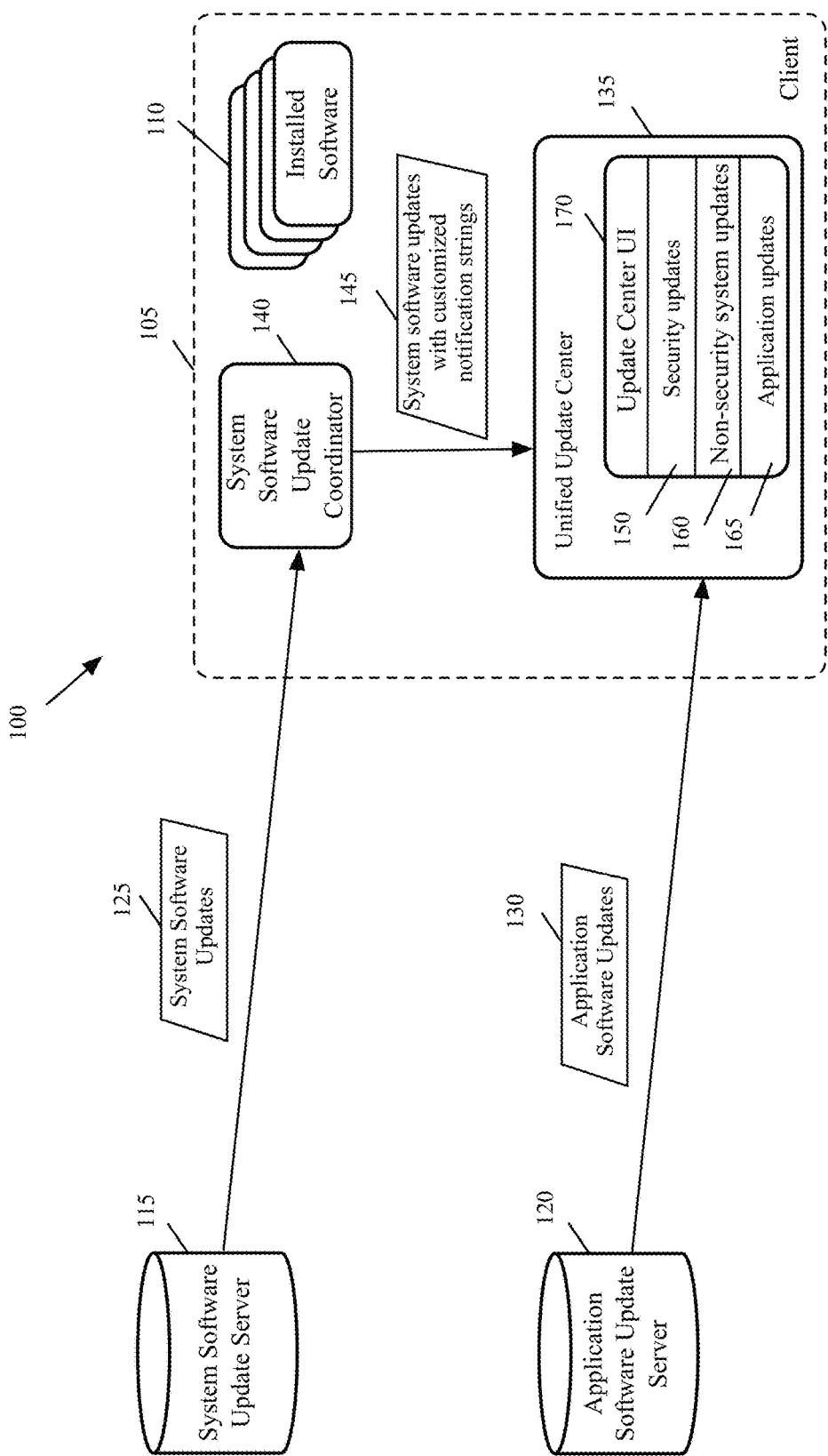
FIG. 1 conceptually illustrates a system for receiving, reporting, and installing software updates for a client device in some embodiments of the invention.

FIG. 1 conceptually illustrates a system 100 for receiving, reporting, and installing software updates for a client device in some embodiments of the invention. As shown, the client device 105 has several software programs 110 installed. The software programs include system software such as the operating system as well application software.

The client device receives software updates from two sets of update servers 115 and 120 through a network such as the Internet (not shown). Each set of update servers includes one or more servers. Only one server in each set is shown and is referred to throughout this Specification for simplicity. Update server 115 provides updates for system level software such as the operating system, device drivers, basic input/output system (BIOS), device firmware, etc. To preserve simplicity and brevity, the term system software (or system level software) in this Specification is used to refer to both system software and system firmware. System level software is designed to operate and control the computer hardware and to provide a platform for running application software. Some of system level software updates relate to security updates while other system level software updates are bug fixes, upgrades, new drivers, etc., which are not security updates. In addition, some of security updates are critical high-priority (or code red) security updates. These updates either have to be immediately installed, have a count down (or delay) to install, or have no count down to install but are more persistently shown to the user to encourage the user to install them. In addition, some high priority updates may require a restart.

Update server 120 provides updates for application software. Application software is designed to help the user to perform specific tasks. Application software may be provided by the same vendor as the operating system or by different vendors referred to as third party vendors. In some embodiments, a client device includes an application (such as the App Store or application store described further below) through which a user can purchase (or acquire for free) software applications. In these embodiments, this application coordinates purchase, download, and updates for the application software. In some embodiments, this application also provides a unified update center 135 for displaying and installing all available updates for the system and application software installed on the device.

Depending on the user preferences setup on the client device 105, the client device either periodically or upon the user command requests the update servers 115 and 120 for a list of available updates. In some embodiments application software update server 120 receives software updates from different application vendors and provides them to client devices. The client device sends a request for a list of available application software updates to the application software update server 120. The application software update server provides a list of all available software updates to the client device. The client device determines the updates that are applicable to the software currently updated on the client device. The client device requests one or more updates and receives the updates from the server. Depending on the preferences set on the client device 105, the software updates are either automatically downloaded to the client device to facilitate quick installation of the updates or the updates are downloaded upon receiving a command from the user.

As shown in the example of FIG. 1, the list 130 of all available application software is received from the application software update server 130 by the unified update center 135 and a list 165 of the application software updates that are applicable to the client device is displayed on the user interface 170.

The client device also sends requests for a list of available system software updates to the system software update server 115. The system software update server provides a list 125 of all available system software updates to the client device. The client device determines the updates that are applicable to the software currently updated on the client device. The client device then requests one or more updates. Depending on the preferences set on the client device 105, the software updates are either automatically downloaded to the client device or the updates are downloaded upon receiving a command from the user. In some embodiments, the client device requests for critical security updates more often than other software updates. The client then receives the requested updates from the server. As shown the example of FIG. 1, system software update server 115 provides a list of the available system software updates 125 to an application (e.g., the system software update coordinator 140) in the client device 105.

As described further below, system level security updates include metadata to indicate the title, subtitle (or text), whether the update is critical (or code red), whether a restart is required, countdown, etc. A system software update coordinator application 140 on the client device receives the list of updates 125, prepares a portion of the page displayed on the user interface 170. This portion of the page includes information about the available security updates and other system software updates.

Figure 2:
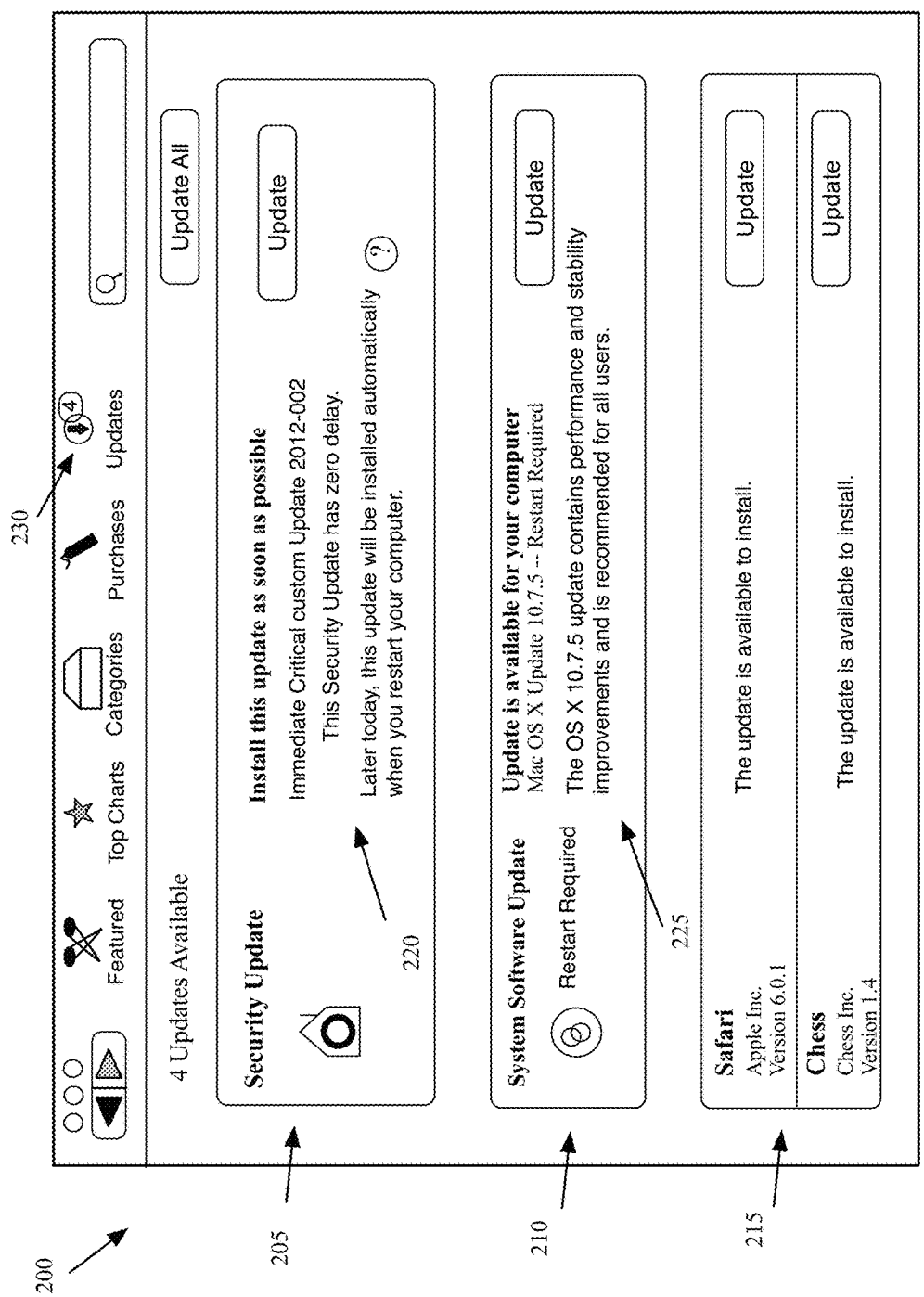
FIG. 2 illustrates an example of a user interface that manages updates received from different sources in some embodiments of the invention.

The user interface 170 provides a unified interface to display the security related system software updates 150, non-security system software updates 160, and application software updates 165. FIG. 2 illustrates an example of a user interface 200 that manages updates received from different sources in some embodiments of the invention.

As shown, each category of updates is shown separately in the user interface 200. Security system software updates are shown in a separate section (or island) 205, non-security system software updates are shown in another separate section 210, and application software updates are shown in another separate section 215. Also as shown in the figure, some updates (such as updates 220 and 225) include customized titles and texts. In some embodiments, system software update coordinator application 140 generates the customized strings for titles and texts using the metadata that are associated with the received updates.

Critical security update in some embodiments is a mechanism to elevate the importance of certain software updates and push them to the user. In some embodiments, the critical security updates are displayed differently than the other security updates (e.g., displayed with different color, different fonts, and/or different attributes such as bold fonts, etc.) to alert the user. In other embodiments, the critical security updates are displayed separately than any other updates. For instance, in some embodiments, section 205 is dedicated to displaying the critical security update and section 210 is used to show all other system software updates including non-critical security updates. Yet other embodiments, critical security updates and non-critical security updates are displayed in two separate dedicated sections.

In some embodiments, the system software update coordinator application 140 uses the received metadata as well as other information such as how many updates are received, how many updates have been received previously that are not installed yet, etc., to generate customized notification strings to display on the user device. The system software update coordinator application 140 also generates post install customized notification strings. The customized notifications 145 for the system software update are sent to the update center 135 to display on a user interface 170.

Although system 100 was described to include one set of servers 115 as system software update servers and a separate set of servers 120 as application software update server, in other embodiments the same set of servers are used both for system software updates as well as application software updates without deviating from the teachings of the invention. For instance, in some embodiments, the same set of servers provide the list of application software updates 130 to the unified update center 135 and provide the list of system software updates 125 to the system software update coordinator 140.

Several more detailed embodiments of the invention are described in sections below. Section I describes different methods for updating software installed on a client device in some embodiments. Next, Section II describes the software architecture for providing software updates in some embodiments of the invention. Finally, a description of an electronic system with which some embodiments of the invention are implemented is provided in Section III.

I. Updating Software Installed on a Client Device

A. Requesting and Receiving Software Updates

In some embodiments, system software updates and application software updates are requested and subsequently received from different servers. System software updates are received from a set of servers that provide the system level software updates such as updates to operating system, device drivers, BIOS, device firmware, etc. On the other hand, application software updates are collected by a set of servers that collect application software updates from different vendors and provide the updates to client devices. In other embodiments, all updates are collected and distributed by the same set of servers. For these embodiments, any references to the system software or application software update server in this Specification refer to the same set of servers.

In some embodiments, the client device requests a list of available software updates from the update servers. The client then receives the list of available software updates. For instance, in some embodiments, the client receives the list as a set of metadata over a secure connection such as https. Based on the specific software or firmware system currently installed on the client device, the client device requests for appropriate software updates.

In some embodiments, the update servers maintain a catalog of all released updates for each version of different software that the update servers provide to client devices. For instance, for an operating system named OS-A with the latest version 3.5, the system software update server maintains a list of all previous updates for different versions of the operating system from version 1.0 to version 3.5 (unless an update is removed or deactivated by the operating system vendor). The update server maintains a similar list for all versions of all other operating systems such as OS-B, ACME-OS, etc., that could be installed on different client devices. If the client device happens to have OS-A operating system, the client device compares the list of available updates and compares them with the currently installed version of the operating system. The client device then determines whether or not to request for one or more of the updates.

Once the update server receives a request to send the identified update for different system software and firmware for a particular device, the update server sends the requested updates (e.g., sends a distribution file for each update) to the particular device. The distribution file for each update includes metadata, which as described below, provide information about the particular update. When the device requests one or more of the available updates, the update server sends the actual payload for the update to be installed on the requesting device.

1. Automatic Request for Software and Firmware Updates

Figure 3A:
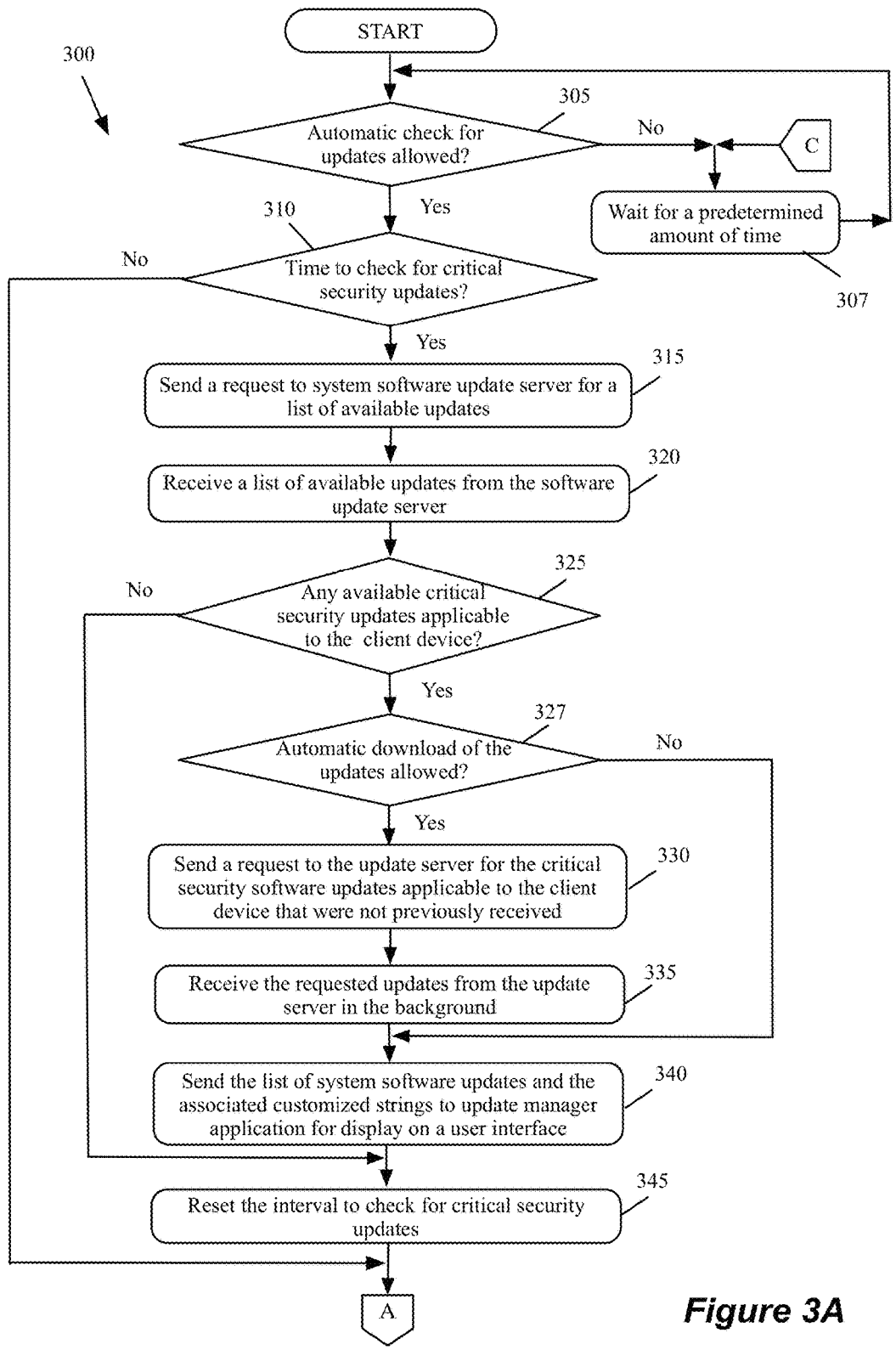
FIGS. 3A-3C conceptually illustrate a process for automatically requesting software and firmware updates from different update servers in some embodiments of the invention.
Figure 3B:
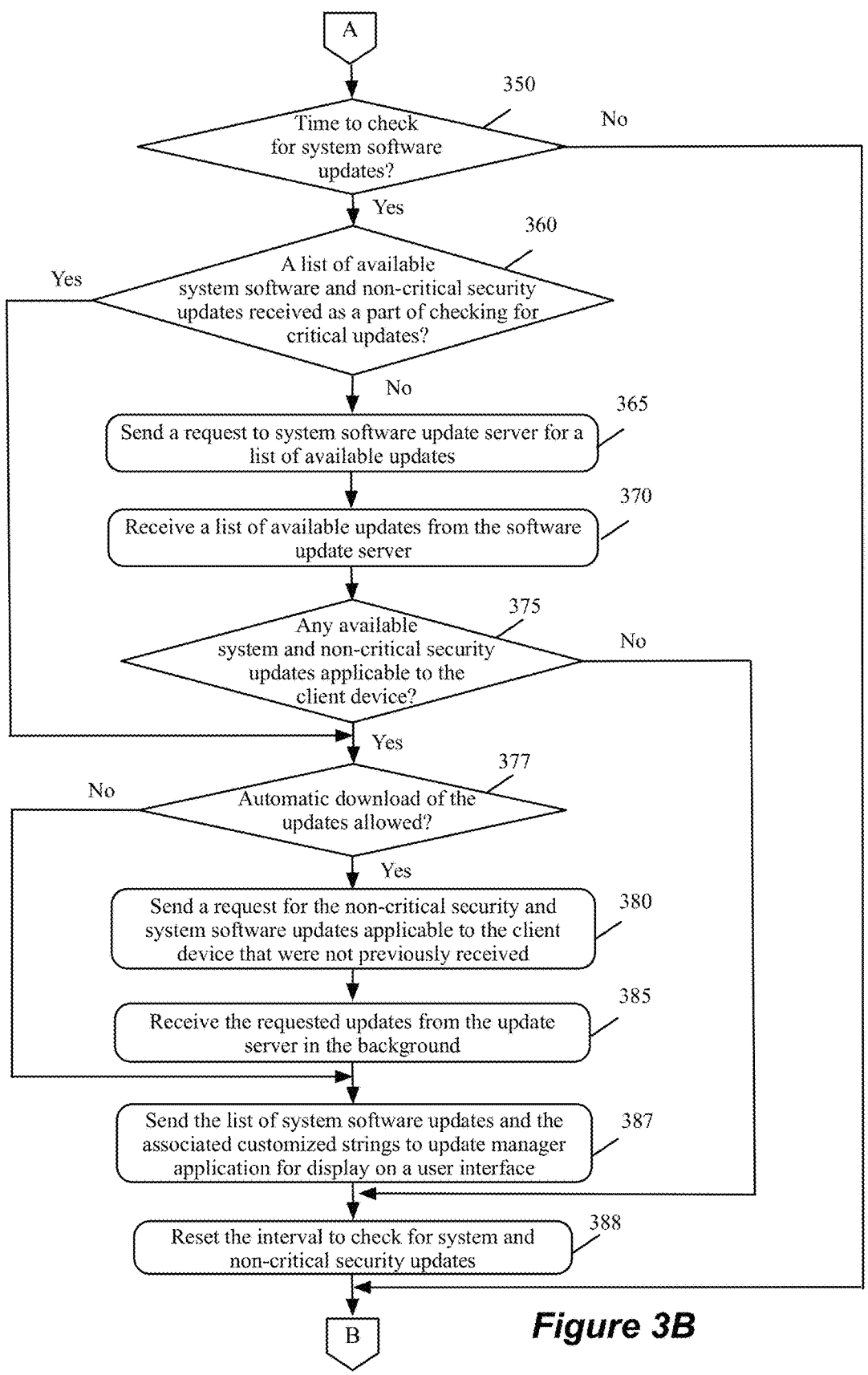
Figure 3C:
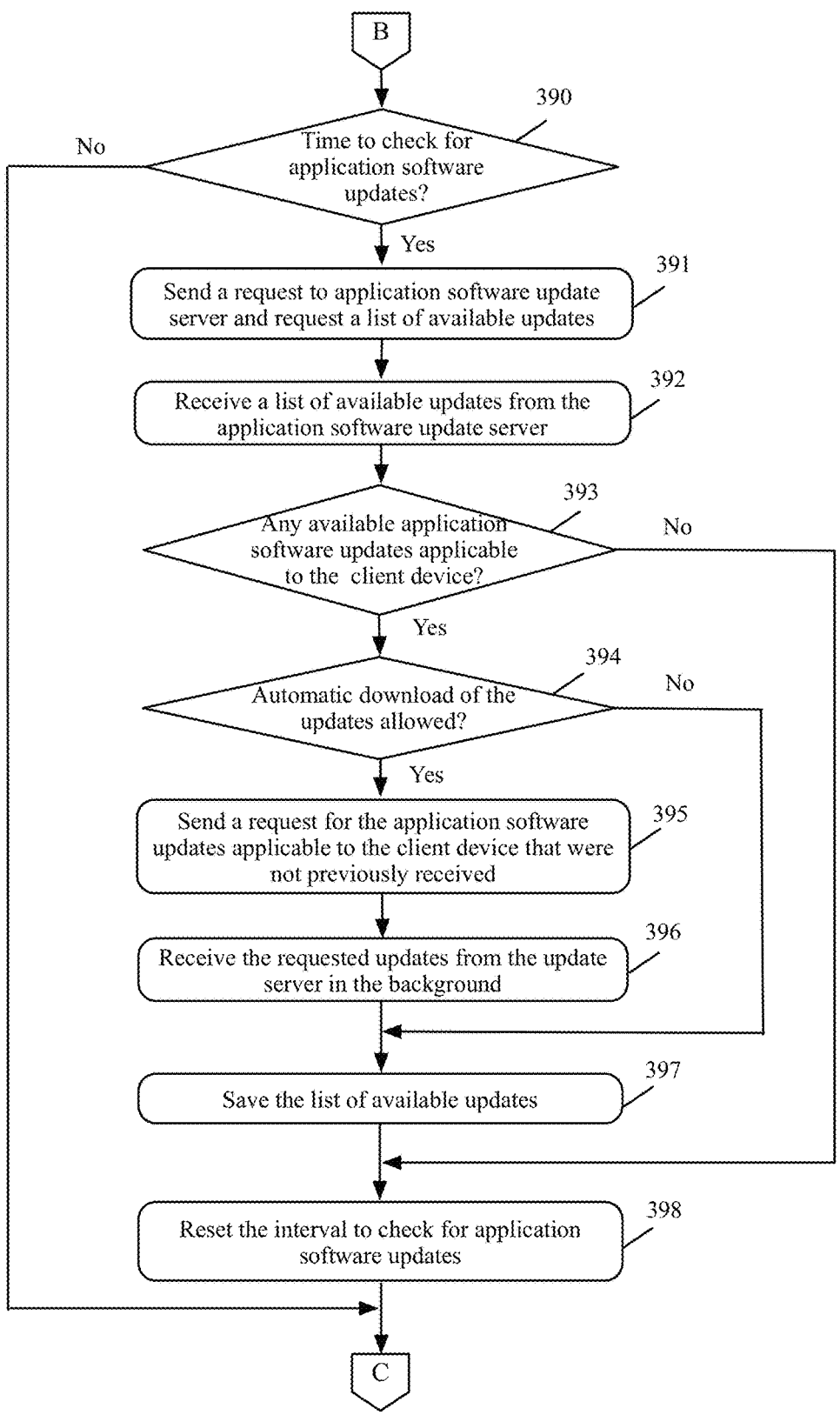

FIGS. 3A-3C conceptually illustrate a process 300 for automatically requesting software and firmware updates from different update servers in some embodiments of the invention. As described above, although process 300 and several other processes described further below refer to separate servers for receiving system and application software, both types of updates are provided from the same server or the same set of servers in some embodiments.

Figure 4:
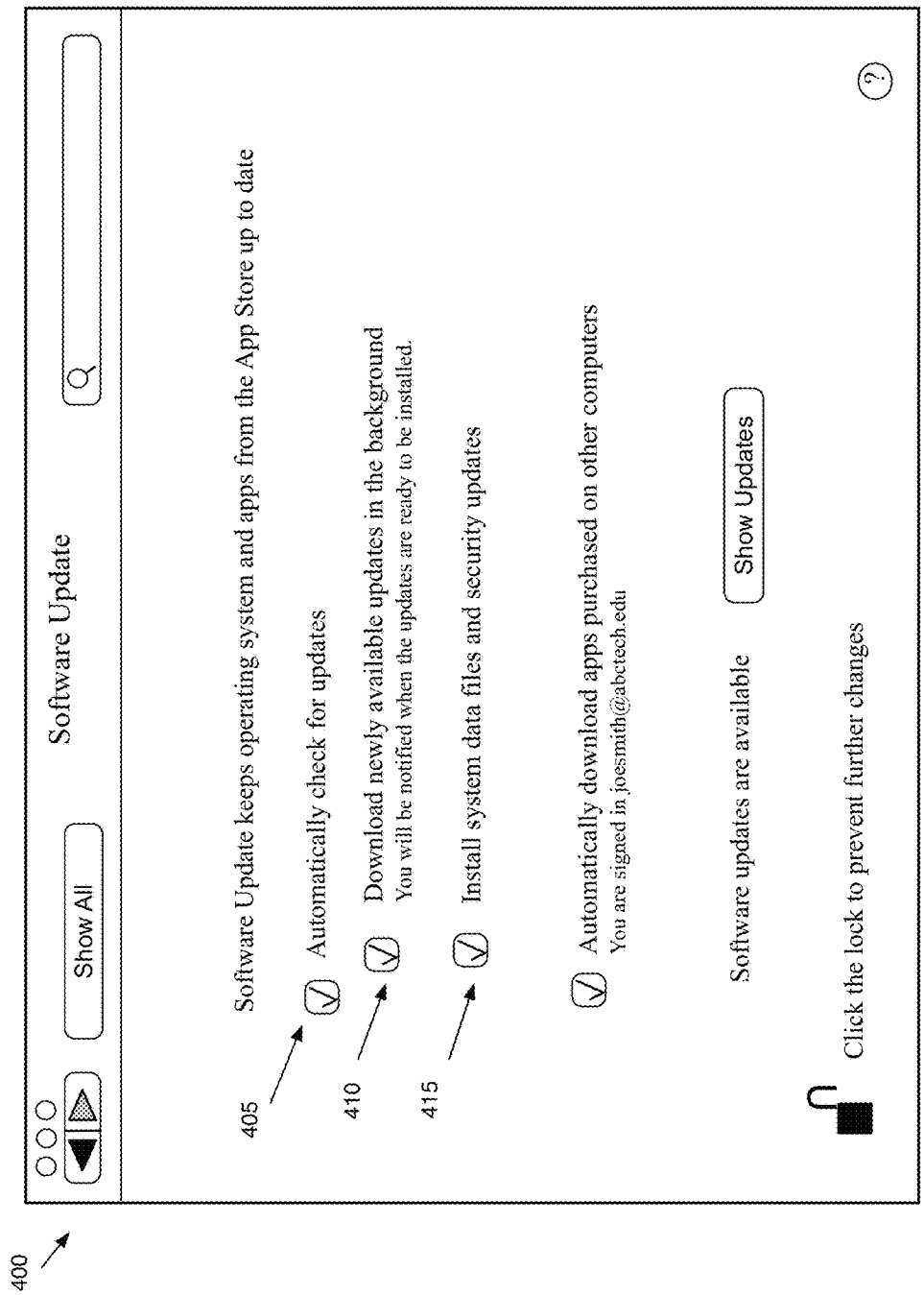
FIG. 4 illustrates a user interface for setting different options for software updates in some embodiments of the invention.

As shown, the process determines (at 305) whether automatic checks for updates are allowed. Some embodiments provide the user (or a system administrator) with an option to allow or prevent automatic checks for software updates. FIG. 4 illustrates a user interface for setting different options for software updates in some embodiments of the invention. As shown, the user interface 400 includes an option 405 for enabling or disabling automatic checks for software update.

When the automatic check for updates is not allowed, process 300 waits (at 307) a predetermined amount of time. The process then returns to 305, which was described above. Otherwise, the process determines (at 310) whether it is time to check for critical security updates. Some embodiments, check for the availability of different type of updates with different frequencies. The time interval for checking for the updates is reset once the update is checked. Some embodiments check for critical security updates more often than other updates. For instance, some embodiments check for critical security updates once a day while they check for other updates once a week. Some embodiments, determine the time interval for checking for each type of update by determining the elapsed time since the availability of the update was last checked. For instance, even if the power of the device is turned off, the actual date and time of the last check for updates is compared with the current date and time to determine whether it is time to check for the updates again. When the process determines that it is not time to check for critical security updates, the process proceeds to 350, which is described below.

Otherwise, the process sends (at 315) a request to system update server for a list of available updates. The process then receives (at 320) a list of available updates from the software update server. The process then determines (at 325) whether any critical security updates are applicable to the client device. For instance, the client device maintains the identification (e.g., name and version) of the client device system software and firmware and checks the list of available software updates for applicability to the software installed on the client device. When there are no applicable critical system security updates available, the process proceeds to 345, which is described below.

Otherwise, the process determines (at 327) whether the automatic download of the updates are allowed. As shown in FIG. 4, one of the options provided to the user or system administrator in some embodiments is an option 410 to allow the automatic download of the available updates in the background. The user is notified when the updates are ready to be installed. The option in some embodiments applies to downloading the system software updates as well as the application software updates. In other embodiments, the option only applies to system software updates.

When the automatic download of the updates is not allowed, process 300 proceeds to 340, which is described below. Otherwise, the process sends (at 330) a request to the update server for the critical security software updates that the client device has determined to be applicable. In some embodiments, any applicable updates that have been previously received but are not installed yet are stored in the client device for a period of time and are not requested for the server again as long as the updates are stored in the client device.

The process then receives (at 335) and stores the requested updates in background. In some embodiments, the update server provides the updates through a content distribution network such as Akamai® or Limelight®. The process then sends (at 340) the list of critical security software updates and the associated customized strings to an application on the client device (e.g., the system software update coordinator application 140) to prepare information regarding the updates for display on a user interface. The process then resets (at 345) the interval to check for critical security updates.

Next, the process then determines (at 350) whether it is time to check for non-critical security software or system software updates. In some embodiments, the critical security updates are requested more often than non-critical security updates or system software updates. If not, the process proceeds to 390, which is described below.

When the process determines that it is time to check for non-critical security software and system software updates, the process determines (at 360) whether the list of non-critical security software and system software updates is recently (e.g., within a predetermine time period) received as a part of checking for critical security updates. When the time to check for the critical security updates and other software updates coincide or is very close, process 300 uses the same list that was received from the system update server to determine the availability of applicable updates for critical security updates as well as non-critical-security and other system software updates. If the list of updates is already available, the process proceeds to 377, which is described below. Otherwise, the process sends (at 365) a request to system software update server for a list of available updates.

The process then receives (at 370) a list of available updates from the software update server. The process then determines (at 375) whether any system software updates or non-critical security updates are applicable to the client device. When there are no applicable updates available, the process proceeds to 388, which is described below.

Otherwise, the process determines (at 377) whether the automatic download of the updates are allowed. When the automatic download of the updates is not allowed, process 300 proceeds to 387, which is described below. Otherwise, the process sends (at 380) a request for the updates that the client device has determined to be applicable. In some embodiments, any applicable updates that have been previously received are stored in the client device for a period of time and are not requested for the server again as long as the updates are stored in the client device. Also, when the time to check for critical security software and the time to check for other system software coincide, process 300 in some embodiments sends one request to the updates server to receive the applicable updates.

The process then receives (at 385) and stores the requested updates in the background. The process then sends (at 387) the list of received updates and the associated customized strings to an application on the client device (e.g., the system software update coordinator application 140) to prepare information regarding the updates for display on a user interface. The process then resets (at 388) the interval to check for system and non-critical security updates.

The process then determines (at 390) whether it is time to check for application software updates. If not, the process proceeds to 307, which was described above. Otherwise, the process sends (at 391) a request to application update server for a list of available updates. The process then receives (at 392) a list of available application updates from the application update server. The process then determines (at 393) whether any application software updates are applicable to the client device. For instance, the client device maintains the identification (e.g., name and version) of the application software installed on the client device and checks the list of available software updates for applicability to the software installed on the client device.

When there are no applicable application software updates available, the process proceeds to 398, which is described below. Otherwise, the process determines (at 394) whether the automatic download of the application updates are allowed. When the automatic download of the updates is not allowed, process 300 proceeds to 397, which is described below. Otherwise, the process sends (at 395) a request for the updates that the client device has determined to be applicable. In some embodiments, any applicable updates that have been previously received but are not installed yet are stored in the client device for a period of time and are not requested for the server again as long as the updates are stored in the client device.

The process then receives (at 396) the requested updates in the background. The process then stores (397) the updates. The process then resets (at 398) the interval to check for application software updates. The process then proceeds to 307, which was described above.

The specific operations of process 300 may not be performed in one continuous series of operations, and different specific operations may be performed in different embodiments. Furthermore, the process could be implemented using several sub-processes, or as part of a larger macro process. For instance, requesting for security and other system software can be performed by one application (such as the system software update coordinator 140 shown in FIG. 1) while requesting for application software update can be performed by another application (such as application 135 shown in FIG. 1). In addition, when the time to check for critical security updates and other system software update coincide, some embodiments send one request for available updates to the system software update server and after determining the application updates send one request to the system software update server for all applicable critical security updates and other system updates.

2. User-Initiated Request for Software and Firmware Updates

Automatic checking for software updates was described by reference to process 300, above. Some embodiments utilize a similar process for user-initiated checking and receiving of updates. For instance, some embodiments provide an option (such as button 230 shown in FIG. 2) for a user to initiate checking for software updates. This option is described in further detail by reference to button 1050 shown in FIG. 10, below.

Once a user request is received to check for software updates, a process similar to process 300 is performed in order to check for the updates and possibly download them into the client device.

B. Metadata Associated with Security Updates

Some of system software and firmware updates are intended to address security issues and fix different security vulnerabilities in the client device. These updates are different than non-security system software and firmware updates. For instance, a non-security system software update might include new features in the operating system, provide bug fixes in certain device drivers, update dictionaries, provide new camera support, etc.

Some security updates include metadata that provide additional information about the update. The metadata include title, subtitle (or text), a countdown to auto install, an indication whether the update is critical, an indication whether the update requires restart, post install information, etc. In some embodiments all security updates can include this additional metadata. In other embodiments, only critical security updates can include this additional metadata. The following is an example of metadata included for a security update in some embodiments. One of ordinary skill in the art will recognize that the specific keywords and formats used for different elements and keys in the following examples can be changed without deviating from the teachings of the invention.

```
<key>ExtendedMetaInfo</key>
<dict>
    <key>CriticalUpdate</key>
    <true/>
    <key>AutoInstallDelay</key>
    <integer>24</integer>
</dict>
```

In this example, the update is identified as a critical update, which will be installed automatically in 24 hours after the notification is displayed on the device. Some embodiments provide the user or an administrator with the option to disable automatic installation of the updates in which case when the auto install delay for an update expires, the user is notified of the update to be installed immediately without automatically installing the update.

In some embodiments, when there are several critical security updates with different delays waiting to be installed on a device, the smallest delay is used for all pending critical updates. For instance, when the countdown for the update with the smallest delay reaches zero, all pending critical updates are installed regardless of the individual countdowns. These and other criteria for installing security updates are further described in the sections below.

In some embodiments each component package that is part of a critical security update includes additional metadata to identify the content-type as critical. For instance, the following is an example metadata that identifies a package as a part of a critical security update in some embodiments.

<pkg-info content-type="critical-update" format-version="2" identifier= . . . .

The CriticalUpdate metadata and/or the content-type metadata is used by the system software update server to limit the scope of the scan for critical updates. Since the critical updates are checked for more often than other updates (e.g., once a day instead of once a week), the metadata that identifies an update as critical updates facilitates the quick identification of these updates and also reduces the amount of download and evaluation of the updates at the client device. The following is another example of metadata for a critical update in some embodiments of the invention.

```
<dict>
    <key>CriticalUpdate</key>
    <true/>
    <key>AutoInstallDelay</key>
    <integer>0</integer>
    <key>NotifyAfter</key>
    <true/>
</dict>
```

In this example, the update is identified as a critical update. Since the AutoInstallDelay is set to zero, the update is installed automatically immediately. Since the NotifyAfter tag is set to true, the user is notified after the update is auto-installed. Some updates include custom strings for notification. Custom strings override default notification strings.

When a security update requires custom notification (either before or after install), the appropriate strings are added to a section of the metadata by using predefined keys. The following is an example of metadata included for an update that is received from security software update server in some embodiments of the invention.

```
<localization>
    <strings language="en"><![CDATA["PRODUCT_TITLE" =
    "Custom Critical Update for OS X";
    "SU_SECURITY_UPDATE_NOTIFY_TITLE" = "Important
    system security update to prevent the WildBootSector virus";
    "SU_SECURITY_UPDATE_NOTIFY_TEXT" = "Please
    install immediately";
    "SU_SECURITY_UPDATE_POST_INSTALL_NOTIFY_
    TITLE" = "Security update successfully installed";
    "SU_SECURITY_UPDATE_POST_INSTALL_NOTIFY_
    TEXT" = "Your computer is now protected from WildBootSector
    virus attack"; ]]>
    </strings>
</localization>
```

In this example, custom notifications for a critical security update are included in a localized string section of the update distribution. The sequence <strings language="en"> sets the default language to English. The term CDATA indicates anything between "<![CDATA[" and "]]>" includes character data rather than markup language.

The SU_SECURITY_UPDATE_NOTIFY_* strings are used by the client device to display the up-front notification prior to the installation of the update and the SU_SECURITY_UPDATE_POST_INSTALL_NOTIFY_* strings are used for the post-install notification (which also require NotifyAfter to be set as shown above).

Some embodiments use a customized string to notify an update when that update is the only critical update waiting to be installed. If there are multiple critical updates, these embodiments use a generic notification regardless of what custom strings do or don't define. In some embodiments custom strings in an update distribution have no effect unless the update is marked as a critical update (e.g., by setting CriticalUpdate to true, as described above). These strings can therefore be speculatively added by an update author in an update distribution in case the update might later be marked as critical prior to distribution to client devices.

C. Notifying the User of Available Updates

Some embodiments, when an update becomes available (e.g., when an automatic update check identifies that one or more system software or application software updates available), display a notification to alert the user of the available update or updates. Some embodiments provide different notifications for an available update. For instance, in some embodiments, a notification (such as a pop up) is displayed on the screen to alert the user of an available update. Some embodiments provide a notification center and display the software update notification in the notification center. Some embodiments provide an update center to display all available security system updates, non-security system updates, and application software updates in the same user interface.

1. Pop UP Notifications

Figure 5:
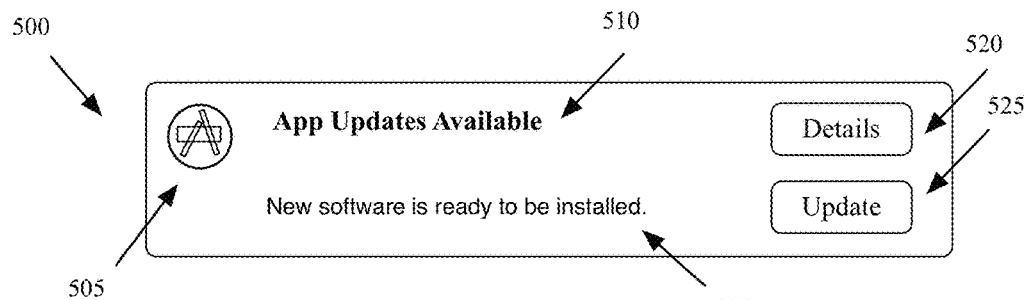
FIG. 5 illustrates an example of a notification that some embodiments display to alert the user of an available application software update.

FIG. 5 illustrates an example of a notification 500 that some embodiments display (e.g., on a corner of the display screen) to alert the user of an available application software update. As shown, an icon 505 identifies the update as an application software update. A generic application notification title 510 and a generic application software update text 515 are also displayed. The user is provided with an option 520 to see the details about the update as well as an option 525 to install the update.

Figure 6:
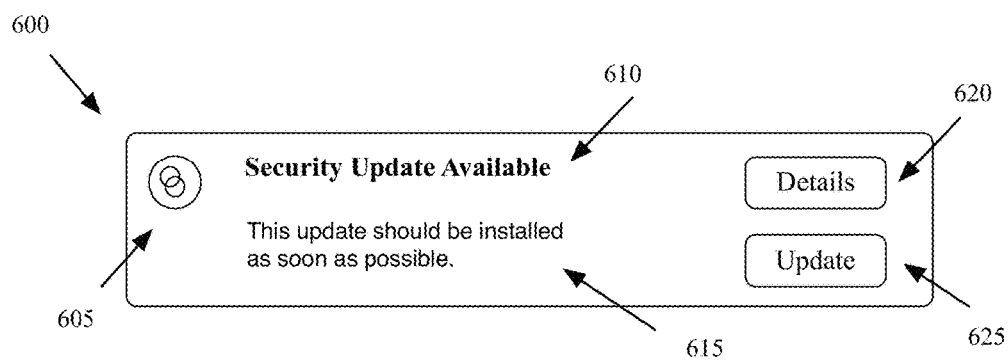
FIG. 6 illustrates an example of a notification that is displayed to alert the user of an available security software update in some embodiments.

FIG. 6 illustrates an example of a notification 600 that is displayed to alert the user of an available security software update in some embodiments. This is an example of a security update that does not include metadata to provide specific details about the update. Therefore, a generic notification is used for the update. As shown, an icon 605 identifies the update as an application software update. A generic security notification title 610 and a generic security software update text 615 are also displayed. The user is also provided with an option 620 to see the details about the update as well as an option 625 to install the update.

Figure 7:
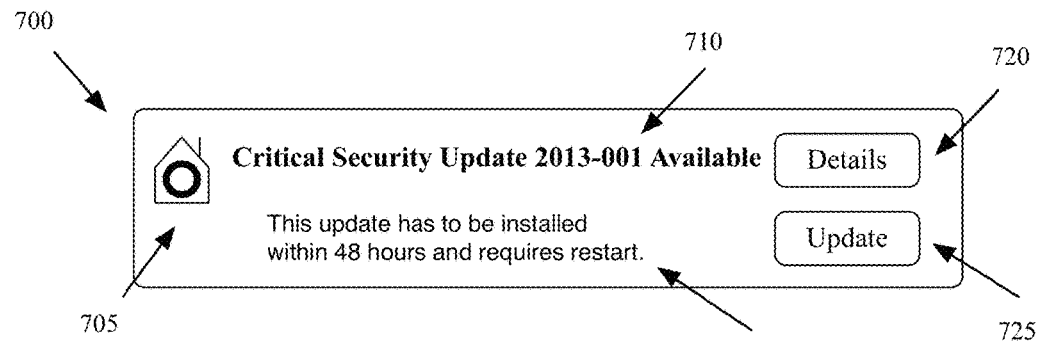
FIG. 7 illustrates an example of a notification that is displayed to alert the user of an available critical security software update in some embodiments.

FIG. 7 illustrates an example of a notification 700 that is displayed to alert the user of an available critical security software update in some embodiments. This is an example of a security update that includes metadata that provide a title and additional description for the update. As shown, an icon 705 that is different than the icon 605 for a non-critical security update identifies the update as a critical application software update. A customized notification title 710 and a customized update text 715 are also displayed. The user is also provided with an option 720 to see the details about the update as well as an option 725 to install the update.

Figure 8:
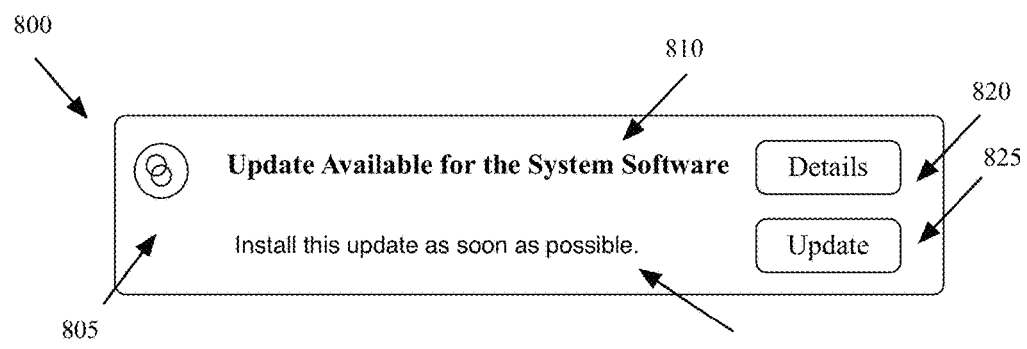
FIG. 8 illustrates an example of a notification that is displayed to alert the user of an available non-security system software update in some embodiments.

FIG. 8 illustrates an example of a notification 800 that is displayed to alert the user of an available non-security system software update (e.g., an upgrade to the operating system) in some embodiments. This is an example of a system software update that is not security related. In this example, an icon 805 that is similar than the icon 605 for a non-critical security update identifies the update. In other embodiments, the icons for the non-critical security updates and regular non-security system software updates are different. A generic notification title 810 and a generic update text 815 are also displayed in this example. The user is also provided with an option 820 to see the details about the update as well as an option 825 to install the update.

In some embodiments, critical update notifications cannot be dismissed and the notification stays on the screen until the critical updates are installed. In other embodiments, the notification is removed from the screen if the user selects to see the details in the software update page (e.g., using the user interface shown in FIG. 11, below). The notification is displayed either immediately or after a short time out (e.g., after 10 minutes instead of 24 hours for non-critical updates) if the user exists the software update page without installing all critical updates.

Generation of customized notification strings for updates based on the associated metadata is described in U.S. patent application Ser. No. 13/841,950, filed Mar. 15, 2013 entitled "Providing Customized Notifications for Security Software Updates." This concurrently filed U.S. Patent Application is incorporated herein by reference.

2. Notification Center

Figure 9:
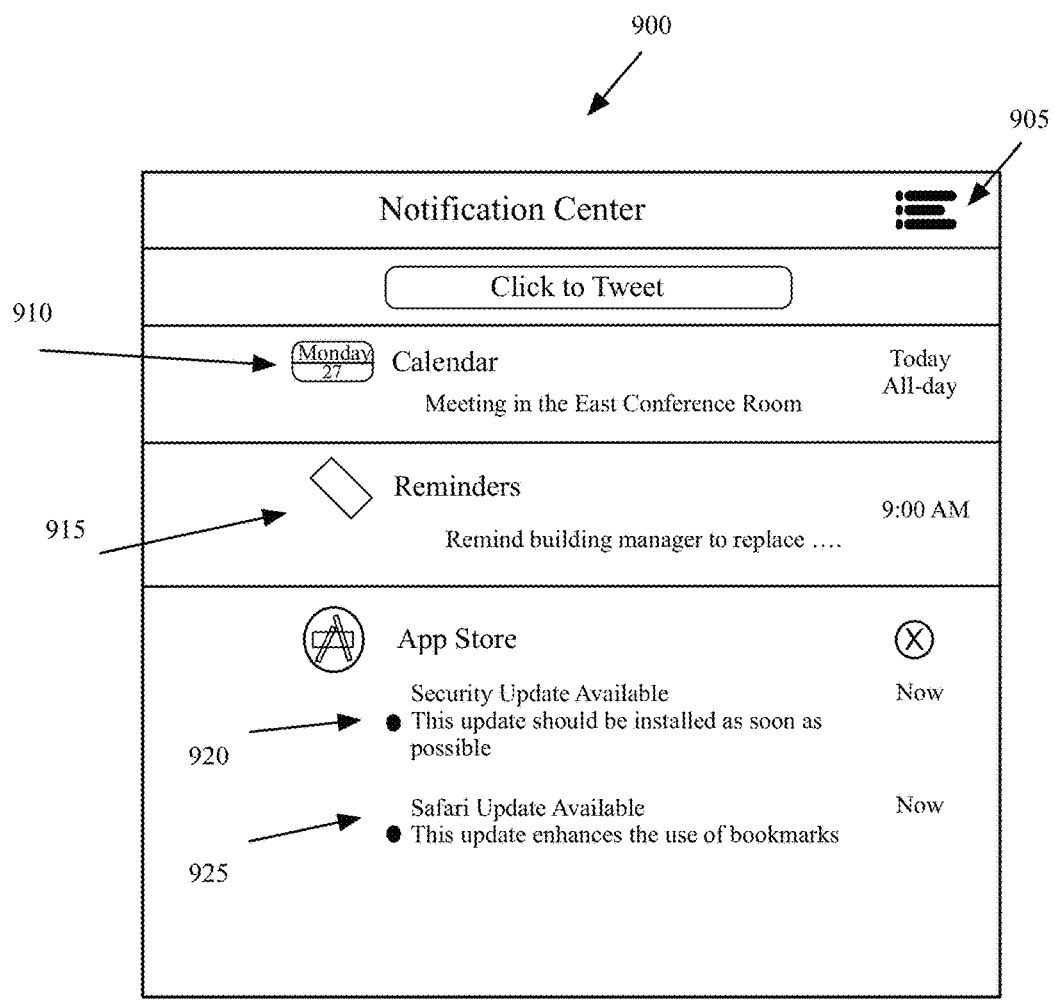
FIG. 9 illustrates an example of a notification center in some embodiments of the invention.

Some embodiments also provide a notification center that is used to display messages and alerts from electronic mail (email), calendar, reminders, games, etc. In some of these embodiments, the notification center is also used to display notifications for third party software, system updates, security updates, and critical security updates. FIG. 9 illustrates an example of a notification center 900 in some embodiments of the invention. The notification center icon 905 is displayed on a menu bar or on a corner of the screen when other applications are being executed. The user can access the notification center 900 from other applications by selecting the notification center icon.

In the example shown, a notification 910 from the calendar application and a notification 915 from the reminders application are currently displayed. In addition several notifications 920-925 for available updates are shown in the notification center. In the embodiment shown in FIG. 9, notifications for security update 920 and application update 925 are displayed in a separate island than other notifications. In some embodiments, each type of software update notification is shown in a separate section in the notification center. In other embodiments, as the illustrated embodiment, all available software update are shown in the same display section.

3. Unified Software Update Center

In some embodiments, a client device includes an application (referred to as App Store or application store) through which a user can purchase (or acquire for free) software applications. In these embodiments, this application coordinates purchase, download, and updates for the application software. In some embodiments, this application also provides a unified update center for displaying and installing all available updates for the system and application software installed on the device.

Figure 10:
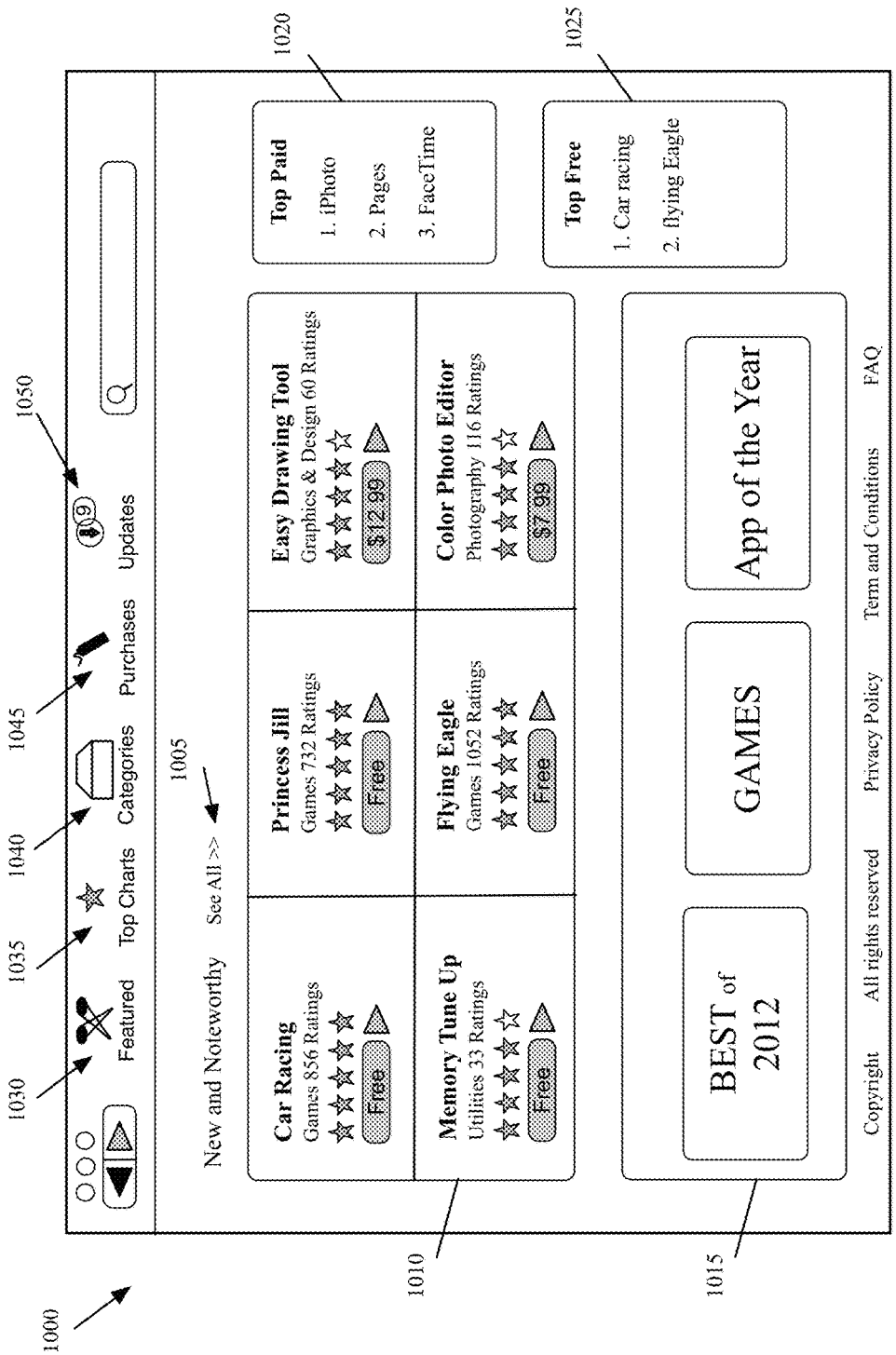
FIG. 10 illustrates an example of a user interface provided by an application for purchasing and managing software applications in some embodiments of the invention.

FIG. 10 illustrates an example of a user interface 1000 provided by an app Store application for purchasing and managing software applications in some embodiments of the invention. As shown, the user interface provides different options 1005-1040 for presenting and downloading different software applications for a fee or for free.

The user interface also provides an option 1045 for the user to view the list of software applications already purchased or acquired for free. The user interface also provides an option 1050 to get updates for software applications that are already installed on the user device. In this example, the option button 1050 shows that there are nine pending updates that have not been installed yet.

Figure 11:
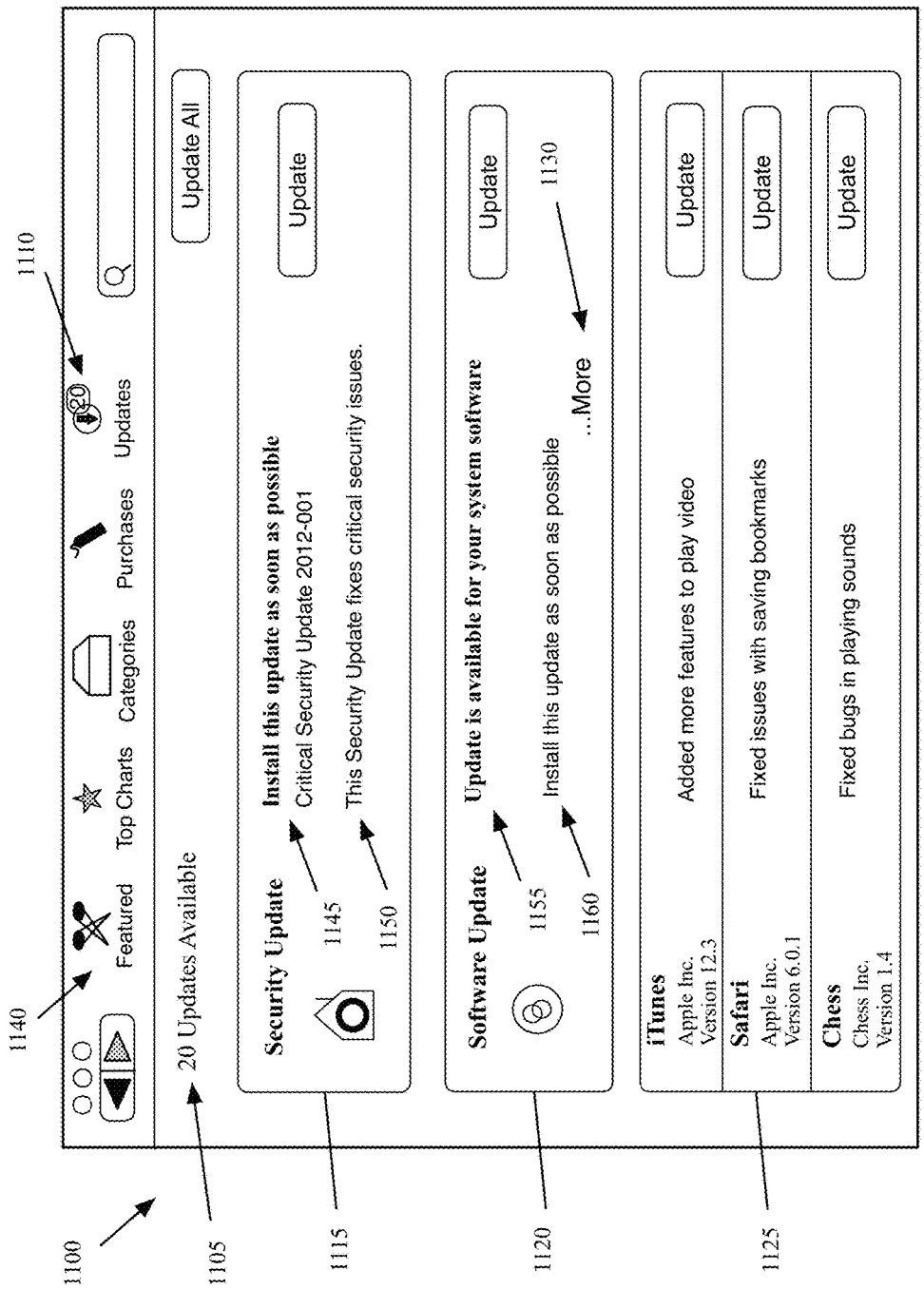
FIG. 11 illustrates a user interface that displays the available updates for security system software, non-security system software, and application software in some embodiments of the invention.

Some embodiments provide a unified user interface for displaying all available updates. In some of these embodiments, the available system security updates, non-security system updates, and application software updates are displayed in separate sections (or islands) on the user interface. In other embodiments, different types of updates are displayed in the same island and the security updates are displayed with different fonts, colors, appearances to ensure the security updates stand out. FIG. 11 illustrates a user interface 1100 that displays the available updates for security system software, non-security system software, and application software in some embodiments of the invention. This user interface is displayed, for example, when the option 1050 in FIG. 10 is selected. As shown in FIG. 11, the total number of available updates 1105 is displayed on the screen as well as on the icon 1110. In this example, the number of available updates has increased from 9 (as shown in FIG. 10) to 20 (as shown in FIG. 11) after the user has selected option 1050 to manually check for additional updates that have become available since the last check for the available update has been performed.

The user interface includes three different sections (or islands) 1115-1125 to display different types of available updates. Display section 1115 displays the security updates. As shown, there is currently one security update available. Some embodiments display the critical security updates with different fonts, colors, and/or icons to distinguish them from non-critical security updates. Other embodiments do not distinguish between critical and non-critical security updates and treat all security updates similarly. The title 1145 and the text 1150 of critical update shown in section 1115 are examples of customized title and text for a critical update.

Display section 1120 displays the non-security system software updates. The title 1155 and the text 1160 for the displayed update are examples of generic title and text for a system update. The control 1130 indicates that more information about the update is available and can be displayed by selecting the control 1130.

In some embodiments, a portion of the software update page that is displayed in the user interface 1100 is received from the application software update server (e.g., server 120 shown in FIG. 1). This portion includes the frames and the titles of different sections 1115-1125, the menu bar 1140, as well as the contents for the application software update section 1125. This portion in some embodiments is sent from the application update server to an application (such as application 135) on the client device to display in the user interface 1100.

The contents of the sections 1115 and 1120, on the other hand, are received from the system software update server (e.g., server 115 shown in FIG. 1). An application in the client device (e.g., application 140) generates the contents of sections 1115 and 1120 based on the update information and the associated metadata received from the system software update server. The contents of sections 1115 and 1120 are then sent to application 135 to update the page displayed in the user interface 1100.

Figure 12:
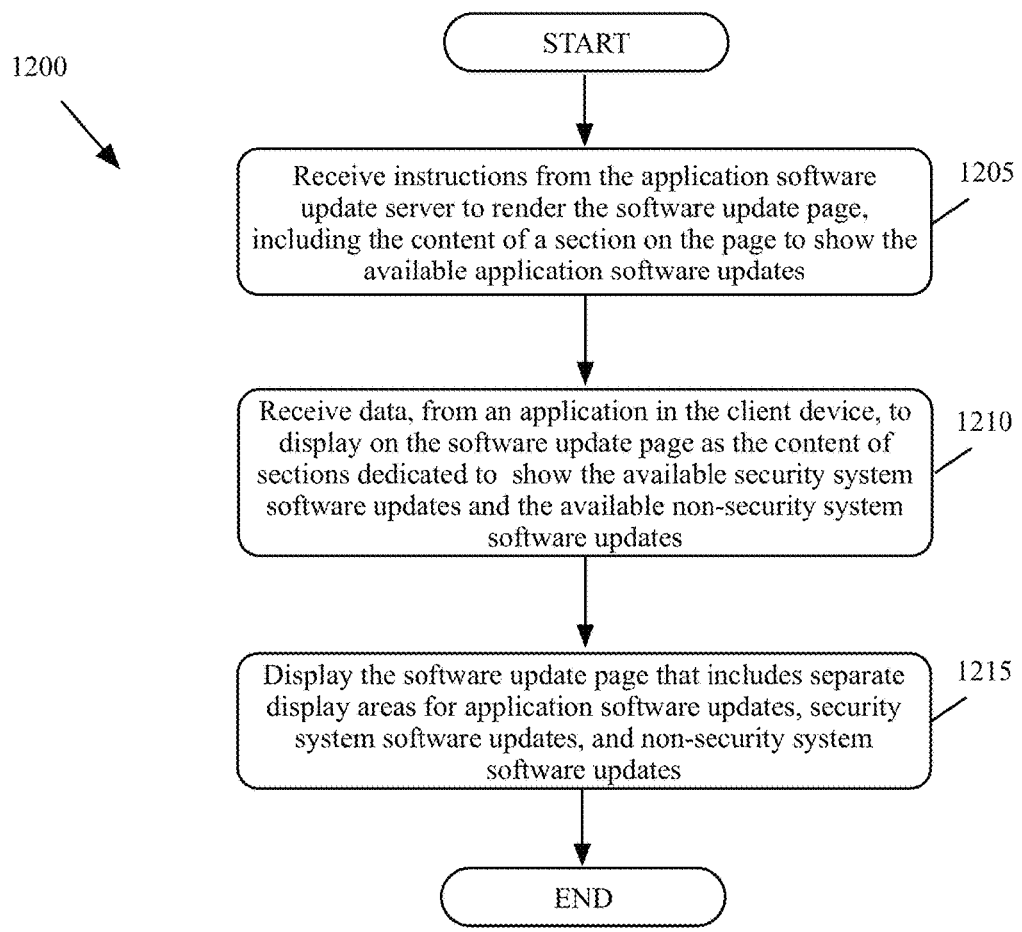
FIG. 12 conceptually illustrates a process for displaying different categories of software updates on a unified user interface in some embodiments of the invention.

FIG. 12 conceptually illustrates a process 1200 for displaying different categories of software updates on a unified user interface in some embodiments of the invention. This process in some embodiments is performed by an application such as application 135 shown in FIG. 1. As shown, the process receives (at 1205) instructions from the application software update server to render a portion of the software update page, including the information about the available application software updates. For instance, the process receives the frames and titles for sections 1115-1125 as well as the content to display in section 1125. In some embodiments, the instructions received from the application software update server are in a language that the software update page can be displayed in a web browser. For instance, the instructions are in Hyper Text Markup Language (HTML) or other markup languages.

The process then receives (at 1210) data from an application (such as application 140 shown in FIG. 1) in the client device to display in sections that are dedicated in the software update page to the available security system software updates and the available non-security system software updates (e.g., the process receives the content to display in sections 1115 and 1120 in FIG. 11). In some embodiments, the instructions received (at 1205) from the application software update server includes placeholders for the content of security system software update section 1115 and non-security system software update section 1120. These placeholders are then updated to include the actual content for the available system software updates on the software update page that is displayed in the user interface 1200 (or to indicate that no updates are available if no updates are available for any of system software update sections 1115 and 1120).

The process then displays (at 1215) the software update page that includes separate display areas and content for application software updates, system software updates, and security updates. The process then ends. In some embodiments, process 1200 adjusts the sizes of sections 1115-1125 depending on how many updates are available for to display in each section. If there are more update available to be all displayed at the same time, selectable controls are displayed in each section to allow the user to see the additional available updates.

Although the user interface 1100 in FIG. 11 has three sections (or islands) 1115-1125 for different types of software updates, other embodiments have different number of sections and/or assign the sections to show different types of the updates. For instance, in some embodiments, section 1115 is dedicated to critical security software update and section 1120 is used to display all other system software updates including the non-security system software updates. Yet other embodiments have separate sections to display the critical security system software updates, the non-critical security system software updates, non-security system software updates, and application software updates. Yet some embodiments do not distinguish between critical and non-critical security system software updates. Still other embodiments display different types of updates in the same island or the same section of the display but the security updates are displayed with different display attributes (e.g., different color, font, boldness, highlight, etc.) to distinguish the security updates (or at least the critical security updates) from other types of updates.

In some embodiments, application 140 has a set of default notification strings for system software updates. These strings are chosen based on the number of the pending updates and restart requirements. The followings are some examples of the default notification strings.

"CRITICAL_UPDATE_NOTIFICATION_TITLE"=
    "Security Update Available"

"CRITICAL_UPDATES_NOTIFICATION_
   TITLE"="Security Updates Available"
"CRITICAL_UPDATE_NOTIFICATION_TEXT"="This
   update should be installed as soon as possible."
"CRITICAL_UPDATES_NOTIFICATION_
   TEXT"="These updates should be installed as soon as
   possible."
"CRITICAL_UPDATE_RESTART_NOTIFICATION_
   TEXT"="Your computer will restart to complete this
   update."
"CRITICAL_UPDATES_RESTART_NOTIFICATION_
   TEXT"="Your computer will restart to complete these
   updates."

When the metadata SU_SECURITY_UPDATE_NOTIFY_* described above, is received from the update server, the default strings are overridden. In some embodiments, the default strings are overridden if the update is the only critical update waiting. The followings are examples of the default strings used for auto-install updates in some embodiments of the invention, when the countdown has hit zero, "CRITICAL_UPDATE_INSTALL_NOW_TITLE"=
   "Security Update Required"
"CRITICAL_UPDATES_INSTALL_NOW_TITLE"=
   "Security Updates Required"
"CRITICAL_UPDATE_INSTALL_NOW_TEXT"=
   "This update should be installed immediately."
"CRITICAL_UPDATES_INSTALL_NOW_TEXT"=
   "These updates should be installed immediately."
"CRITICAL_UPDATE_INSTALL_NOW_RESTART_
   TEXT"="Restart now to complete the installation of
   this update."
"CRITICAL_UPDATES_INSTALL_NOW_RESTART_
   TEXT"="Restart now to complete the installation of
   these updates."

The followings are examples of default notification strings when post-install notifications are enabled, and not overridden by SU_SECURITY_UPDATE_POST_INSTALL_NOTIFY_*.

"CRITICAL_UPDATE_POSTINSTALL_
   NOTIFICATION_TITLE"="Security Update
   Installed"
"CRITICAL_UPDATES_POSTINSTALL_
   NOTIFICATION_TITLE"="Security Updates
   Installed"
"CRITICAL_UPDATE_POSTINSTALL_
   NOTIFICATION_TEXT"="A new security update was
   installed on your Mac."
"CRITICAL_UPDATES_POSTINSTALL_
   NOTIFICATION_TEXT"="New security updates
   were installed on your Mac."

Figure 13:
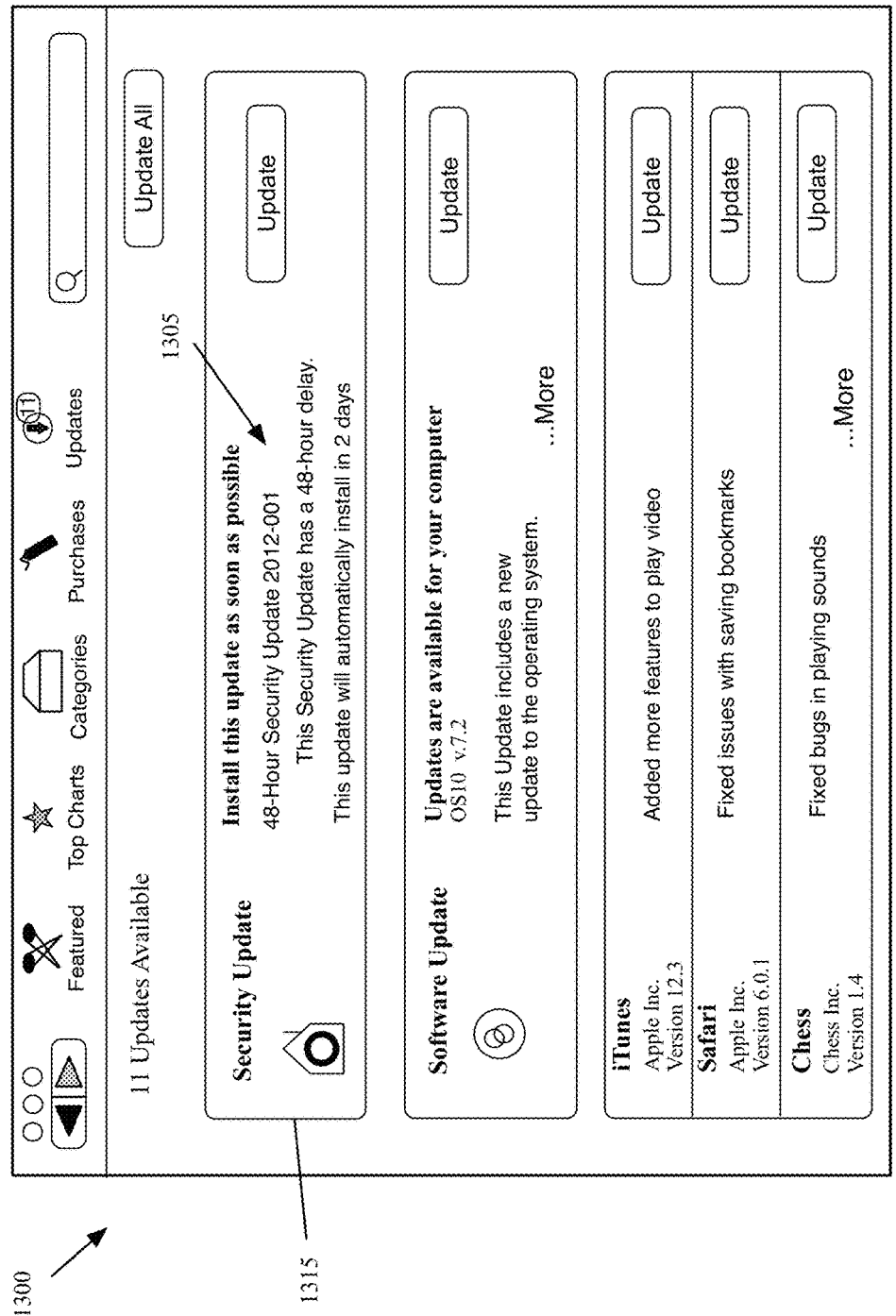
FIG. 13 illustrates an example of a user interface that displays a security update with customized title and customized text in some embodiments of the invention.

FIG. 13 illustrates an example of a user interface 1300 that displays a security update with customized title and customized text in some embodiments of the invention. As shown, the security system software update section 1315 includes one critical update. The text 1305 of this update includes a customized string that indicates the update has a 48-hour delay. The text also indicates that the update will automatically be installed in 2 days.

Figure 14:
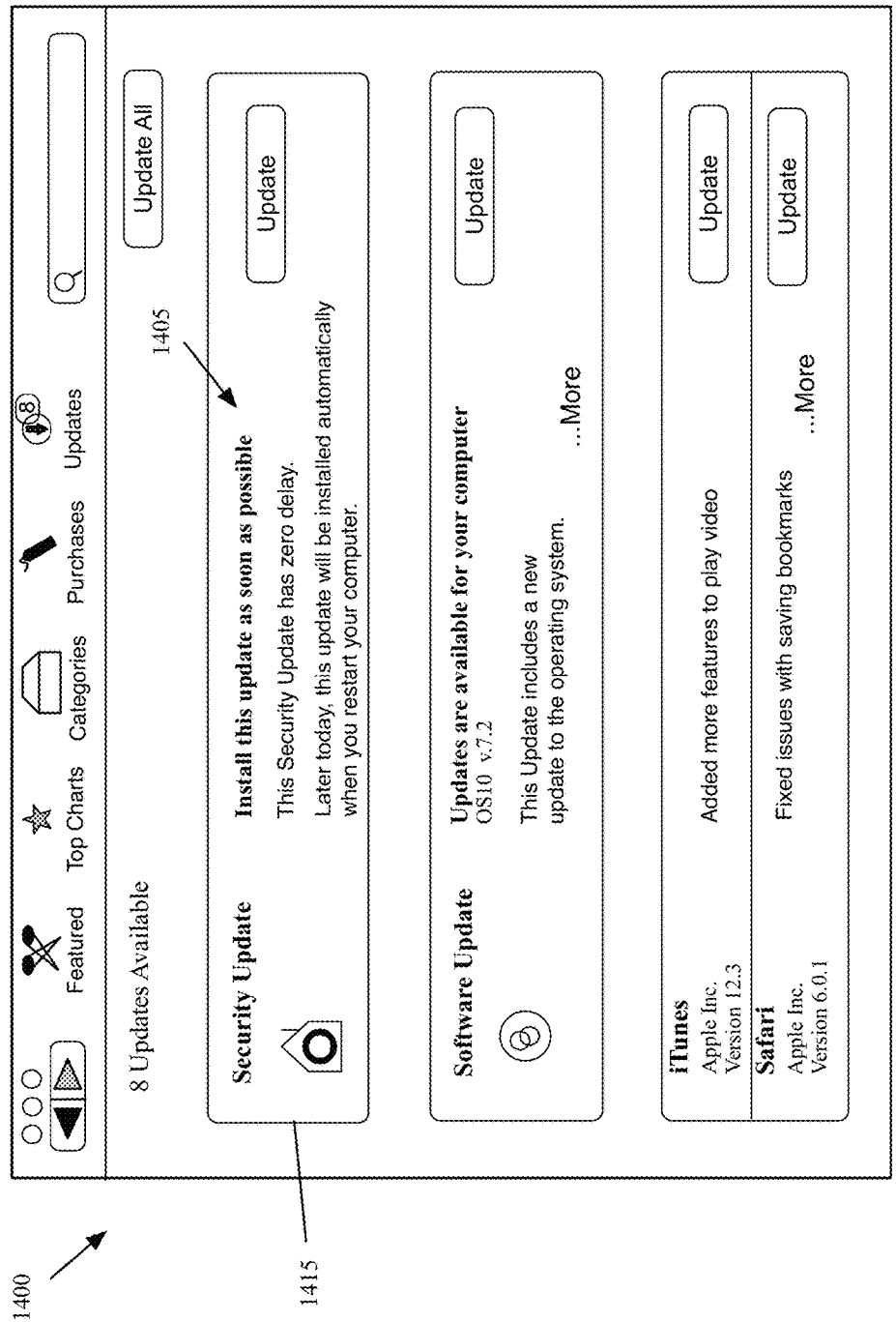
FIG. 14 illustrates another example of a user interface that displays a security update with customized title and customized text in some embodiments of the invention.

FIG. 14 illustrates another example of a user interface 1400 that displays a security update with customized title and customized text in some embodiments of the invention. As shown, the security system software update section 1415 includes one critical update. The text 1405 of this update includes a customized string that indicates the update has zero delay. The text also indicates that the update will be installed automatically when the user restarts the computer.

D. Installing the Available Security Updates

Some embodiments provide several mechanisms for automatic and user initiated installation of security updates. In some embodiments, a subset of security updates is identified as critical security updates. In other embodiments, all security updates are treated as critical updates. In all these embodiments, the critical security updates (being all security updates or a subset that is identified as critical updates) are treated with more urgency than other updates.

As described above, security updates include additional associated metadata that facilitate the urgent treatment of these updates. The list of available software updates that the client device receives from the system software update server includes metadata that are associated with an update either when the update author created a distribution package for the update or was later added to the package at the update server. For instance, the update author can add metadata to identify the update as a critical security update. Alternatively, the update server in some embodiments adds metadata to the package to identify the update as a critical update when the update becomes critical subsequent to distribution by the author. In addition, some critical security updates include metadata to indicate whether an update has to be installed immediately or has a delay to install. The updates can also be installed manually by user commands.

1. Automatic Installation of Security Updates

Figure 15:
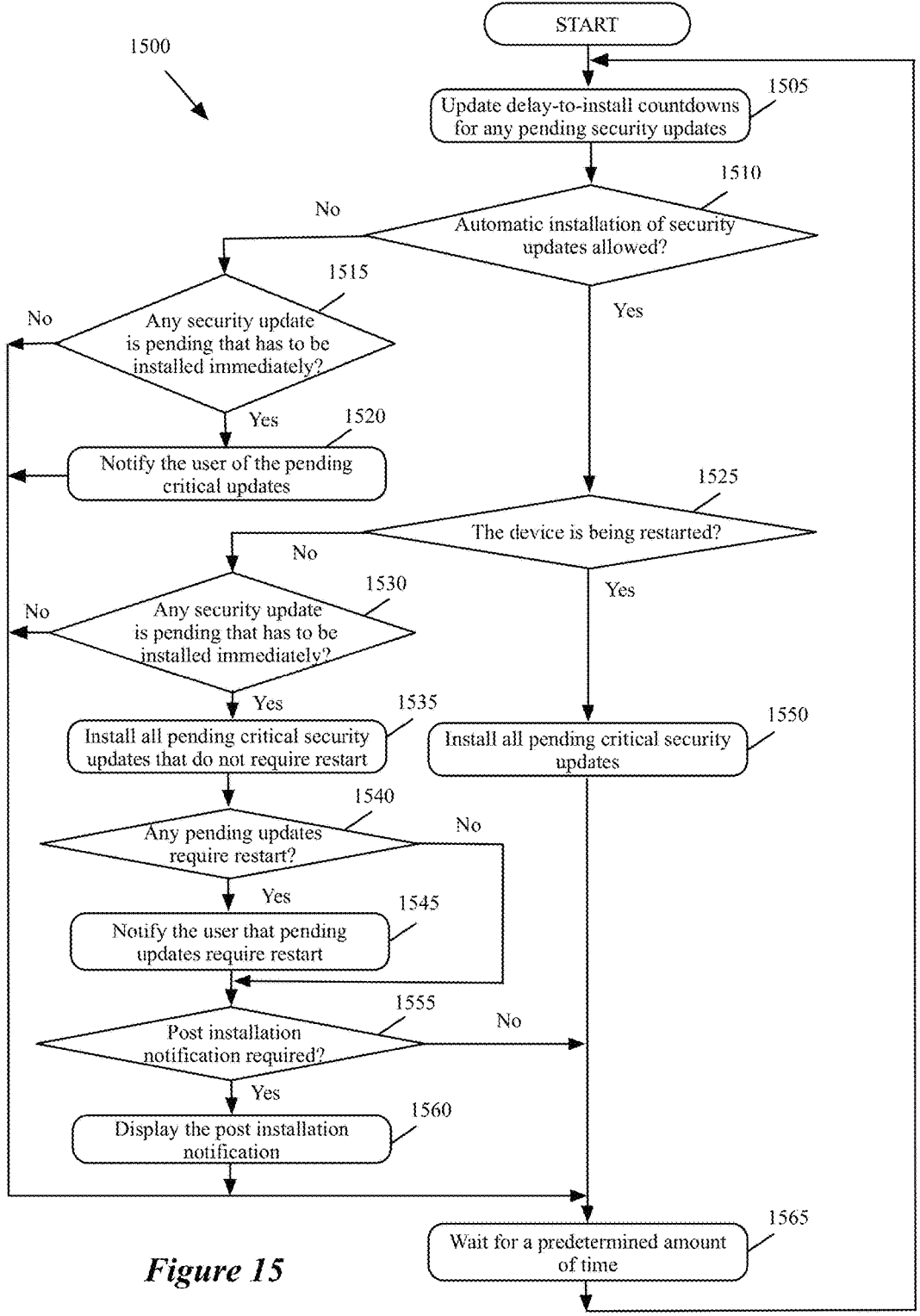
FIG. 15 conceptually illustrates a process for automatically installing security updates in some embodiments of the invention.

FIG. 15 conceptually illustrates a process 1500 for automatically installing security updates in some embodiments of the invention. As shown, the process updates (at 1505) the delay-to-install counters for the pending security updates (if any). A security update can be associated with a countdown or "delay-to-install counter" (e.g., the AutoInstallDelay metadata described above) that identifies how much the installation of the update can be delayed after the availability of the security update is first announced on the device. The delay to install the update is specified in a predetermined unit of time (e.g., hours). A security update can also have associated metadata to identify the update as an update to immediately install (e.g., by setting the countdown to zero). A security update can also have no specific countdown.

Process 1500 in some embodiments is periodically activated (e.g., after the predetermined amount of time described in 1565 below has elapsed) and updates any countdowns by the predetermined amount of time until the countdowns reach zero. The process then determines (at 1510) whether automatic updates are allowed. Some embodiments provide the user or a system administrator with an option to allow automatic installation of security updates. As in the example shown in FIG. 4, option 415 allows automatic installation of all security updates. Other embodiments provide an option to allow automatic installation of critical security updates but not non-critical security update. In the example of FIG. 4, the same option 415 also authorizes automatic installation of system data files such as updates to dictionaries, etc. Other embodiments provide a separate option (or no option) to allow automatic installation of system data files.

Referring back to FIG. 15, when automatic updates are allowed, the process proceeds to 1525, which is described below. Otherwise, the process determines (at 1515) whether any security update is pending that has to be installed immediately. Process 1500 makes this determination when the countdown for any pending security updates is zero, i.e., either the countdown was originally set to zero when the update was received from the update server or the update had a countdown that has been subsequently expired.

When there is no security update that has to be installed immediately, process 1500 proceeds to 1565, which is described below. Otherwise, the process notifies (at 1520) the user of the pending critical updates that require immediate installation. The process then proceeds to 1565, which is described below. The process in some embodiments displays (at 1520) a message on the device display screen and/or sounds an alert to get the user's attention.

The process determines (at 1525) whether the device is currently being restarted (i.e., the process is activated during a restart). If not, the process proceeds to 1530, which is described below. Otherwise, the process installs (at 1550) all pending security updates or all pending critical security updates. As described above by reference to option 415 in FIG. 4, some embodiments provide the user or system administrator with the option to enable automatic install of all security updates while other embodiments provide the option to enable automatic install of all critical security updates. The process then proceeds to 1565, which is described below.

When the device is not being restarted, the process determines (at 1530) whether any security updates is pending that has to be installed immediately. Process 1500 makes this determination when the countdown for any pending security updates is zero, i.e., either the countdown was originally set to zero when the update was received from the update server or the update had a countdown that has been subsequently expired.

When there is no security update that has to be installed immediately, process 1500 proceeds to 1565, which is described below. Otherwise, the process installs (at 1535) all pending security updates (or all critical security updates, depending on the specific preference settings) that do not require restart. The updates that require restart are either not installed or installed and proceed up to a point that the restart is required. The process then determines (at 1540) whether any pending updates remain that requires restart. If not, the process proceeds to 1555, which is described below. Otherwise, the process notifies (at 1545) the user of any pending critical updates that have not been installed.

Process 1500 then determines (at 1555) whether post installation notification is required. If not, the process proceeds to 1565, which is described below. Otherwise, the process displays (at 1560) the post installation notification. Process 1500 waits (at 1565) a predetermined amount of time and then proceeds back to 1505, which was described above. In some embodiments, the predetermined time is the actual elapsed time. Therefore, if the device is turned off or is in hibernation for a period of time, that period of time is considered in determining the wait time. For instance, consider the example when the wait period is one day. If the device is kept on for two hours after process 1500 reaches operation 1560, is turned off for 18 hours, and is turned on again, then he process performs operation 1505 four hours after it is turned on again. The predetermined wait time in some embodiments depends on what type of updates is pending. For instance, when any critical update is pending, the wait time is set to a first period of time (e.g., 10 minutes) and when no critical updates are pending, the wait time is set to 1 day.

2. Manual Installation of Security Updates

In addition to automatic installation of security updates, the user is provided with different options to manually install all or a selected number of the pending security updates. For instance, the user can select the update button in any of FIGS. 6-7 to install the security update or updates that are announced.

Figure 16:
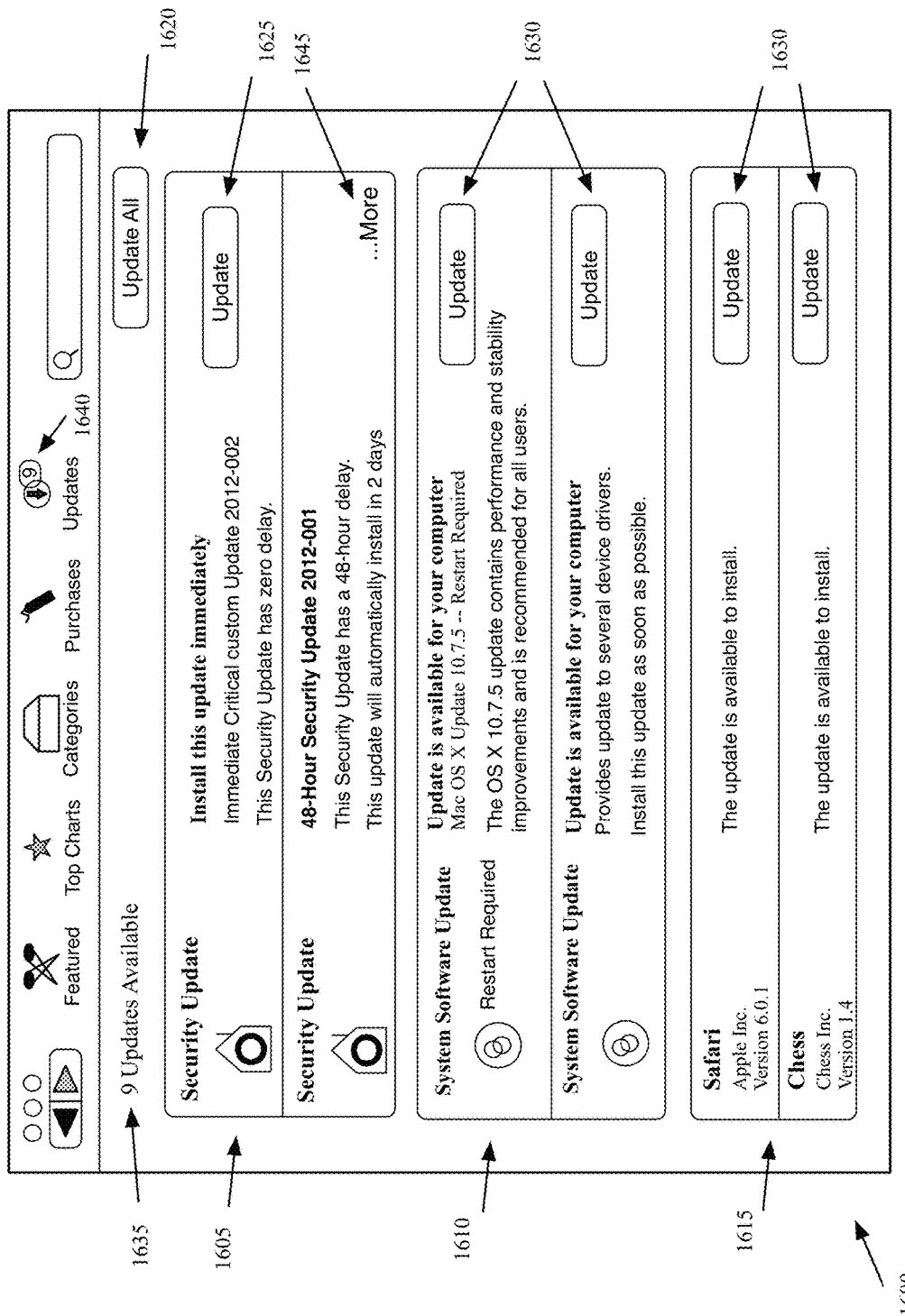
FIG. 16 illustrates an example of a user interface manages updates received from different sources in some embodiments of the invention.

In addition, the user is provided with different options in the unified software update user interface to install one or more security updates. FIG. 16 illustrates an example of a user interface 1600 that manages updates received from different sources in some embodiments of the invention. This user interface is displayed, for example, when the option 1050 in FIG. 10 is selected.

In this example, a total of nine updates are available (as shown by 1635 and 1640). Two updates are shown in each category of security system software updates 1605, non-security system software updates 1610, and application software updates 1615. In addition, several more security updates are available that can be viewed by selecting the option 1645. As shown in the figure, all pending update regardless of the category can be installed at once by selecting the update all button 1620.

In addition, updates in non-security system software update section 1610 and application software update section 1615 can be individually installed by selecting each update button 1630. In the illustrated embodiments, the updates in the security updates section 1605 cannot be individually installed. Instead, all pending security updates (including the updates that are viewable by selecting option 1645) are installed when the user selects the update button 1625. In other embodiments (not shown), the security updates are also individually selectable.

II. Software Architecture

Figure 17:
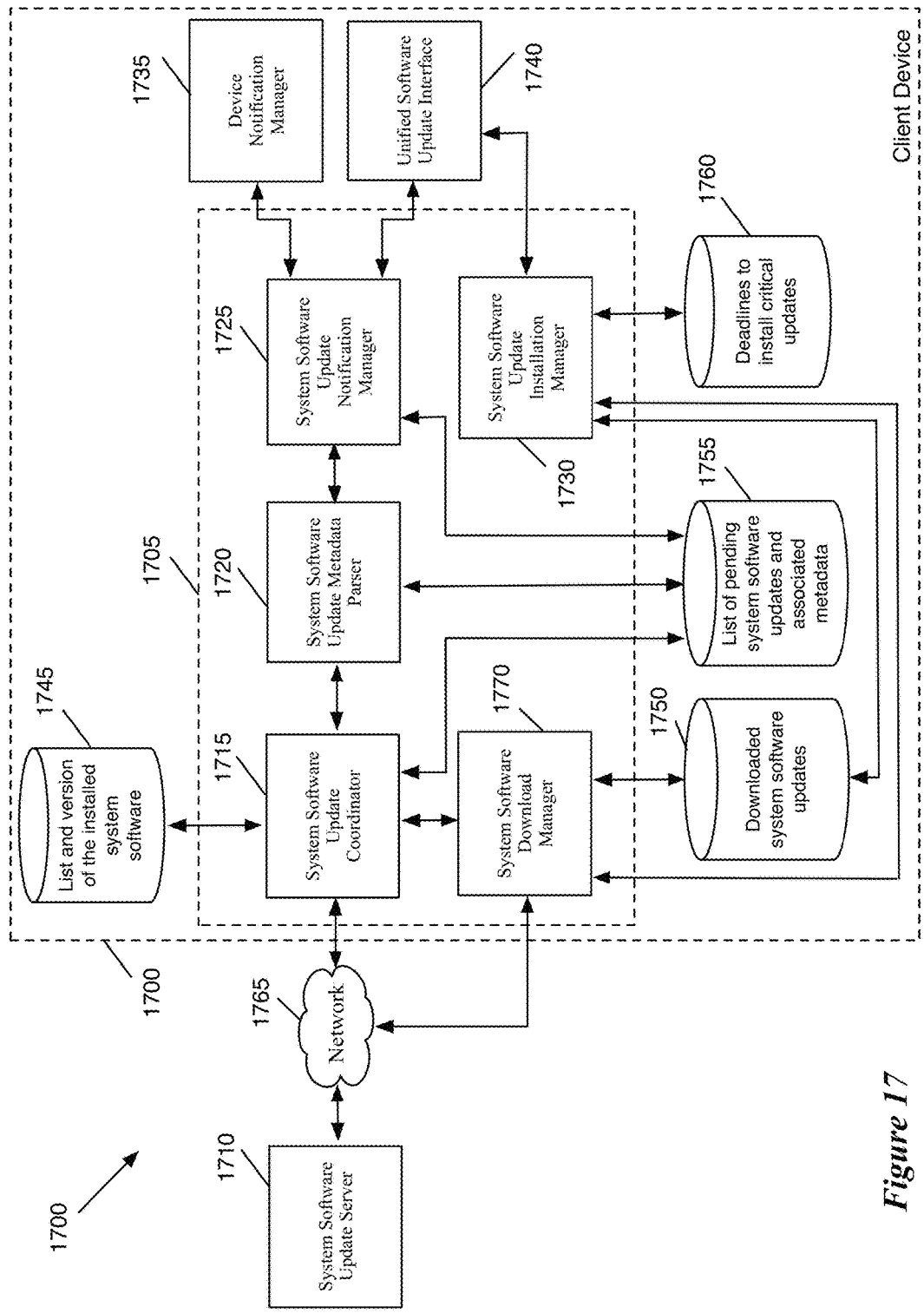
FIG. 17 conceptually illustrates the software architecture for system software update in some embodiments of the invention.
Figure 18:
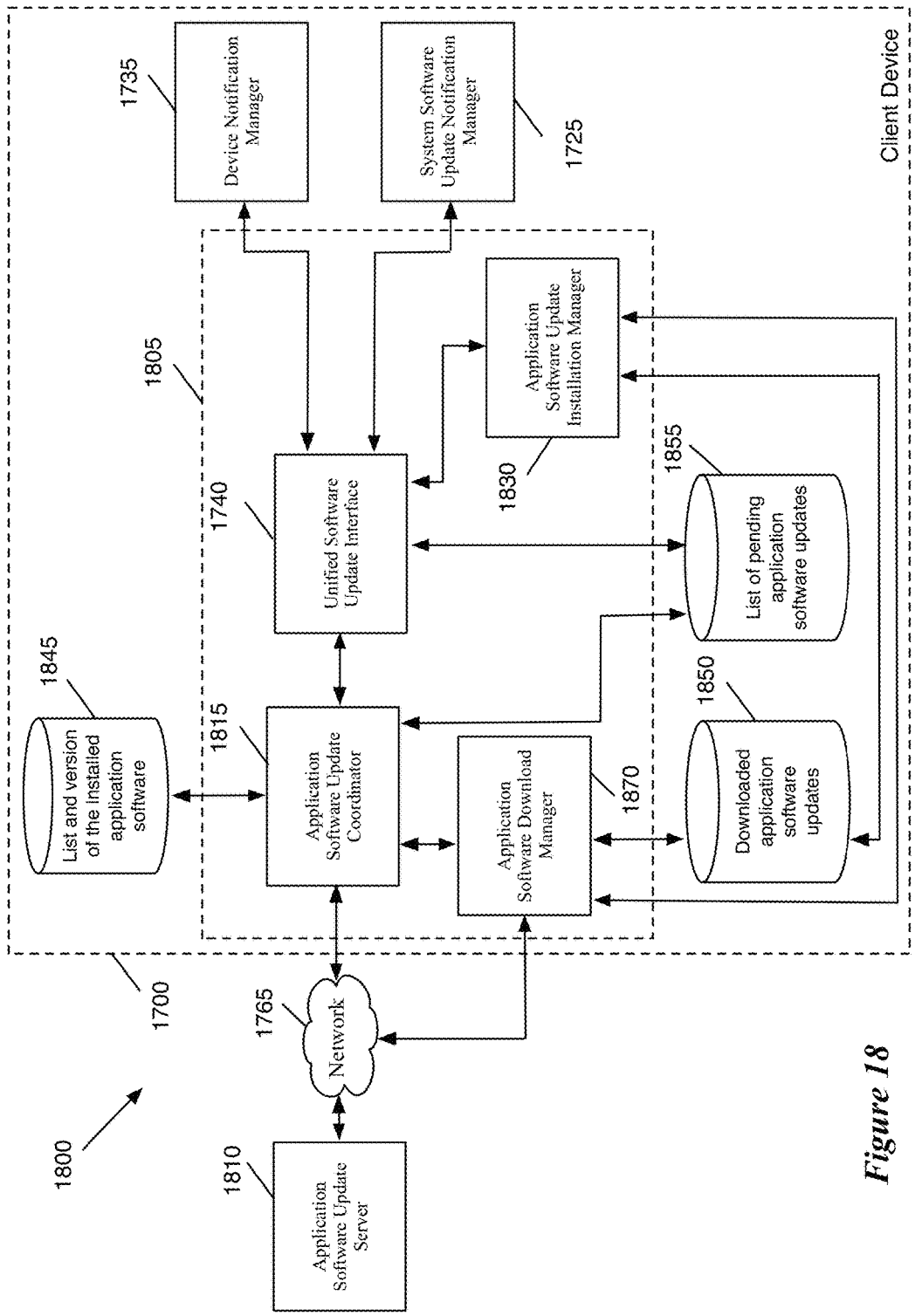
FIG. 18 conceptually illustrates the software architecture for a unified software update center in some embodiments of the invention.

In some embodiments, the processes described above are implemented as software running on a particular machine, such as a computer, a media player, a touchpad, a cell phone, etc. FIGS. 17 and 18 conceptually illustrate the software architecture of different components for managing, displaying, and installing software updates in some embodiments.

FIG. 17 conceptually illustrates the software architecture for system software update of a device 1700 in some embodiments of the invention. The system software update components 1705 include a System Software Update Coordinator module 1715, a System Software Update Metadata Parser module 1720, a System Software Update Notification Manager 1725, a System Software Download Manager module 1770, and a System Software Update Installation module 1730.

System Software Update Coordinator module 1715 sends requests to the System Software Update Server 1710 through a network 1765 such as the Internet for a list of the available system software updates. System Software Update Coordinator module 1715 in some embodiments contacts System Software Update Server 1710 after receiving a user command. In addition, System Software Update Coordinator module 1715 contacts the server automatically with different frequencies to receive critical security updates and other system software updates.

Software Update Coordinator module 1715 receives the list of available system software updates from System Software Update Server. Software Update Coordinator module 1715 determines the updates that are applicable to the client device and adds them to the list of pending system software updates and associated metadata 1755 stored in the client device. When automatic software downloading is enabled on the device, System Software Update Coordinator module 1715 coordinates with to System Software Download Manager 1770 to download the applicable system software updates and save them in storage 1750. Software Update Coordinator module 1715 also coordinates with System Software Update Metadata Parser module 1720 to parse the list of pending system software updates and associated metadata 1755 and provide the extracted metadata to other system Software Update Notification Manager module 1730.

Software Update Notification Manager module 1725 uses the list of pending system software updates and the associated metadata and displays (e.g., as pop ups) notifications for the pending critical security system software updates (e.g., as shown in FIG. 7), non-critical security system software updates (e.g., as shown in FIG. 6), and non-security system software updates (e.g., as shown in FIG. 8) and display them in the notification user interface.

In addition, Software Update Notification Manager module 1725 provides data to Device Notification Manager module 1735 and Unified Software Update Interface module 1740. Device Notification Manager module 1735 receives notifications, messages, and alerts from different applications and modules (such as email, calendar, reminders, games, etc.) on the device and displays them in a notification user interface such as the user interface shown in FIG. 9. As described by reference to FIG. 18 below, Unified Software Update Interface module 1740 receives data from Software Update Notification Manager module 1725 for the content displayed in sections of software update page that are dedicated to system software updates (e.g., the content for sections 1115 and 1120 in FIG. 11).

System Software Update Installation Manager module 1730 receives user-initiated requests (e.g., through user interfaces provided by the Device Notification Manager module 1735, Unified Software Update Interface 1740, or different pop up notifications) to install one or more pending updates. In addition, System Software Update Installation Manager module 1730 checks updates preferences set for the device and checks the countdowns to install critical updates. Once System Software Update Installation Manager module 1730 determines that one or more updates can be installed (either automatically or based on user commands), the module retrieves the downloaded system software updates 1750 and installs them on the device. If the required updates are not downloaded in the background, System Software Update Installation Manager module 1730 requests System Software Download Manager module 1770 to download the requested updates from the System Software Update Server 1710.

FIG. 18 conceptually illustrates the software architecture for a unified software update center for a device 1700 in some embodiments of the invention. The unified software update center in some embodiments is part of a larger application such as the App Store described by reference to FIG. 10 above. For simplicity, only the components 1805 related to software updates are shown in FIG. 18. As shown, these components include Application Software Update Coordinator module 1815, Unified Software Update Interface module 1740, Application Software Update Installation Manager module 1830, and Application Software Download Manager module 1870.

Application Software Update Coordinator module 1815 sends requests to the Application Software Update Server 1810 through a network 1765 such as the Internet for a list of the available application software updates. Application Software Update Coordinator module 1815 in some embodiments contacts System Software Update Server 1820 either after receiving a user command or periodically to receive application software updates for the device 1700.

Application Update Coordinator module 1815 receives the list of available system software updates from Application Software Update Server. Application Update Coordinator module 1815 determines the updates that are applicable to the client device and adds them to the list of pending application software updates 1855 stored in the client device. When automatic downloading for application software updates is enabled on the device, Application Software Update Coordinator module 1815 coordinates with to Application Software Download Manager 1870 to download the available application software updates and save them in storage 1850.

In some embodiments, Application Software Update Server 1810 renders one or more display pages (e.g., in a browser compatible language such as HTML) and sends them to Application Software Update Coordinator module 1815, which in turn passes the pages to Unified Software Update Interface module 1740. Examples of pages displayed by the Unified Software Update Interface module 1740 were described by reference to FIGS. 2, 11, 13, 14, and 16, above. The pages received from the Application Software Update Server 1810 includes frames and the titles of different sections, the menu bar, as well as the contents for the application software update section (e.g., section 1125 in FIG. 11).

In addition, Unified Software Update Interface module 1740 receives data to display as the content for the sections that are dedicated to system software updates (e.g., sections 1115 and 1120 in FIG. 11). This data is received from System Software Update Notification Manager 1725 based on the available critical security updates, non-critical security updates, and other system software updates.

Unified Software Update Interface module 1740 receives also uses the list of pending application software updates 1855 and displays (e.g., as pop ups) notifications for the pending application software updates (e.g., as shown in FIG. 5). In addition, Unified Software Update Interface module 1740 provides notifications for application software updates to Device Notification Manager module 1735, which displays them in a notification user interface such as the user interface shown in FIG. 9.

Application Software Update Installation Manager module 1830 receives user-initiated requests (e.g., through user interfaces provided by the Device Notification Manager module 1735, Unified Software Update Interface 1740, or different pop up notifications) to install one or more pending updates. In addition, Application Software Update Installation Manager module 1830 checks updates preferences set for the device to determine whether any application software updates can be automatically installed. Once Application Software Update Installation Manager module 1830 determines that one or more updates can be installed (either automatically or based on user commands), the module retrieves the downloaded application software updates 1850 and installs them on the device. If the required updates are not downloaded in the background, Application Software Update Installation Manager module 1830 requests Application Software Download Manager module 1870 to download the requested updates from the Application Software Update Server 1810.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 19:
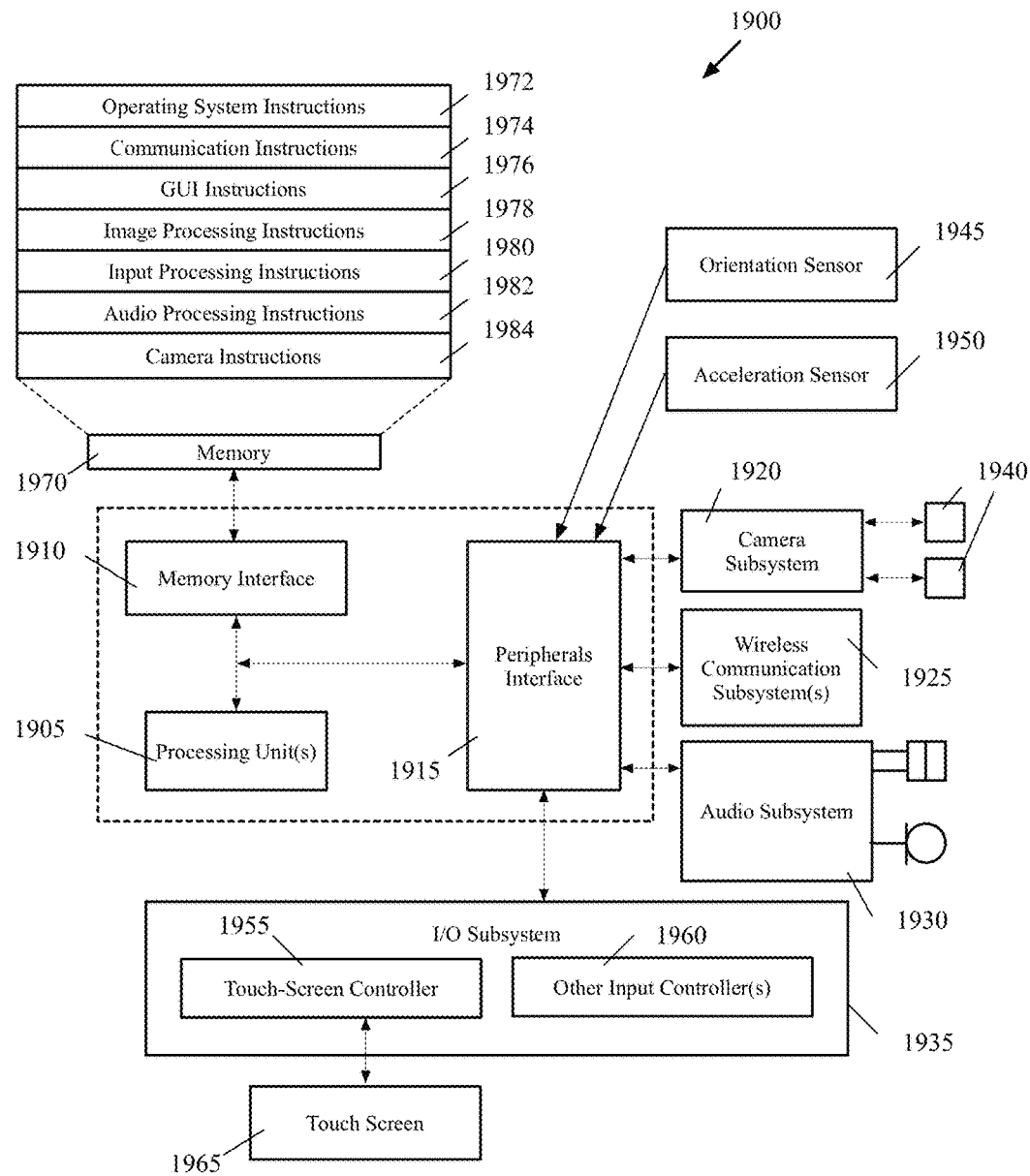
FIG. 19 is an example of an architecture of a mobile computing device in some embodiments of the invention.

Several applications such as the content authoring and publishing application, the digital content viewing application, and multimedia management application of some embodiments operate on mobile devices, such as smart phones (e.g., iPhones®), tablets and touchpads (e.g., iPads®), or ebook readers (e.g., Kindle®). FIG. 19 is an example of an architecture 1900 of such a mobile computing device. As shown, the mobile computing device 1900 includes one or more processing units 1905, a memory interface 1910 and a peripherals interface 1915.

The peripherals interface 1915 is coupled to various sensors and subsystems, including a camera subsystem 1920, a wireless communication subsystem(s) 1925, an audio subsystem 1930, an I/O subsystem 1935, etc. The peripherals interface 1915 enables communication between the processing units 1905 and various peripherals. For example, an orientation sensor 1945 (e.g., a gyroscope) and an acceleration sensor 1950 (e.g., an accelerometer) are coupled to the peripherals interface 1915 to facilitate orientation and acceleration functions.

The camera subsystem 1920 is coupled to one or more optical sensors 1940 (e.g., a charged coupled device (CCD) optical sensor, a complementary metal-oxide-semiconductor (CMOS) optical sensor, etc.). The camera subsystem 1920 coupled with the optical sensors 1940 facilitates camera functions, such as image and/or video data capturing. The wireless communication subsystem 1925 serves to facilitate communication functions. In some embodiments, the wireless communication subsystem 1925 includes radio frequency receivers and transmitters, and optical receivers and transmitters (not shown in FIG. 19). These receivers and transmitters of some embodiments are implemented to operate over one or more communication networks such as a GSM network, a Wi-Fi network, a Bluetooth network, etc. The audio subsystem 1930 is coupled to a speaker to output audio (e.g., to output user-specific questions for generating the escrow key). Additionally, the audio subsystem 1930 is coupled to a microphone to facilitate voice-enabled functions, such as voice recognition (e.g., for searching), digital recording, etc.

The I/O subsystem 1935 involves the transfer between input/output peripheral devices, such as a display, a touch screen, etc., and the data bus of the processing units 1905 through the peripherals interface 1915. The I/O subsystem 1935 includes a touch-screen controller 1955 and other input controllers 1960 to facilitate the transfer between input/output peripheral devices and the data bus of the processing units 1905. As shown, the touch-screen controller 1955 is coupled to a touch screen 1965. The touch-screen controller 1955 detects contact and movement on the touch screen 1965 using any of multiple touch sensitivity technologies. The other input controllers 1960 are coupled to other input/control devices, such as one or more buttons. Some embodiments include a near-touch sensitive screen and a corresponding controller that can detect near-touch interactions instead of or in addition to touch interactions.

The memory interface 1910 is coupled to memory 1970. In some embodiments, the memory 1970 includes volatile memory (e.g., high-speed random access memory), non-volatile memory (e.g., flash memory), a combination of volatile and non-volatile memory, and/or any other type of memory. As illustrated in FIG. 19, the memory 1970 stores an operating system (OS) 1972. The OS 1972 includes instructions for handling basic system services and for performing hardware dependent tasks.

The memory 1970 also includes communication instructions 1974 to facilitate communicating with one or more additional devices; graphical user interface instructions 1976 to facilitate graphic user interface processing; image processing instructions 1978 to facilitate image-related processing and functions; input processing instructions 1980 to facilitate input-related (e.g., touch input) processes and functions; audio processing instructions 1982 to facilitate audio-related processes and functions; and camera instructions 1984 to facilitate camera-related processes and functions. The instructions described above are merely exemplary and the memory 1970 includes additional and/or other instructions in some embodiments. For instance, the memory for a smartphone may include phone instructions to facilitate phone-related processes and functions. Additionally, the memory may include instructions for a keychain backup or restoration application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 19 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 19 may be split into two or more integrated circuits.

B. Computer System

Figure 20:
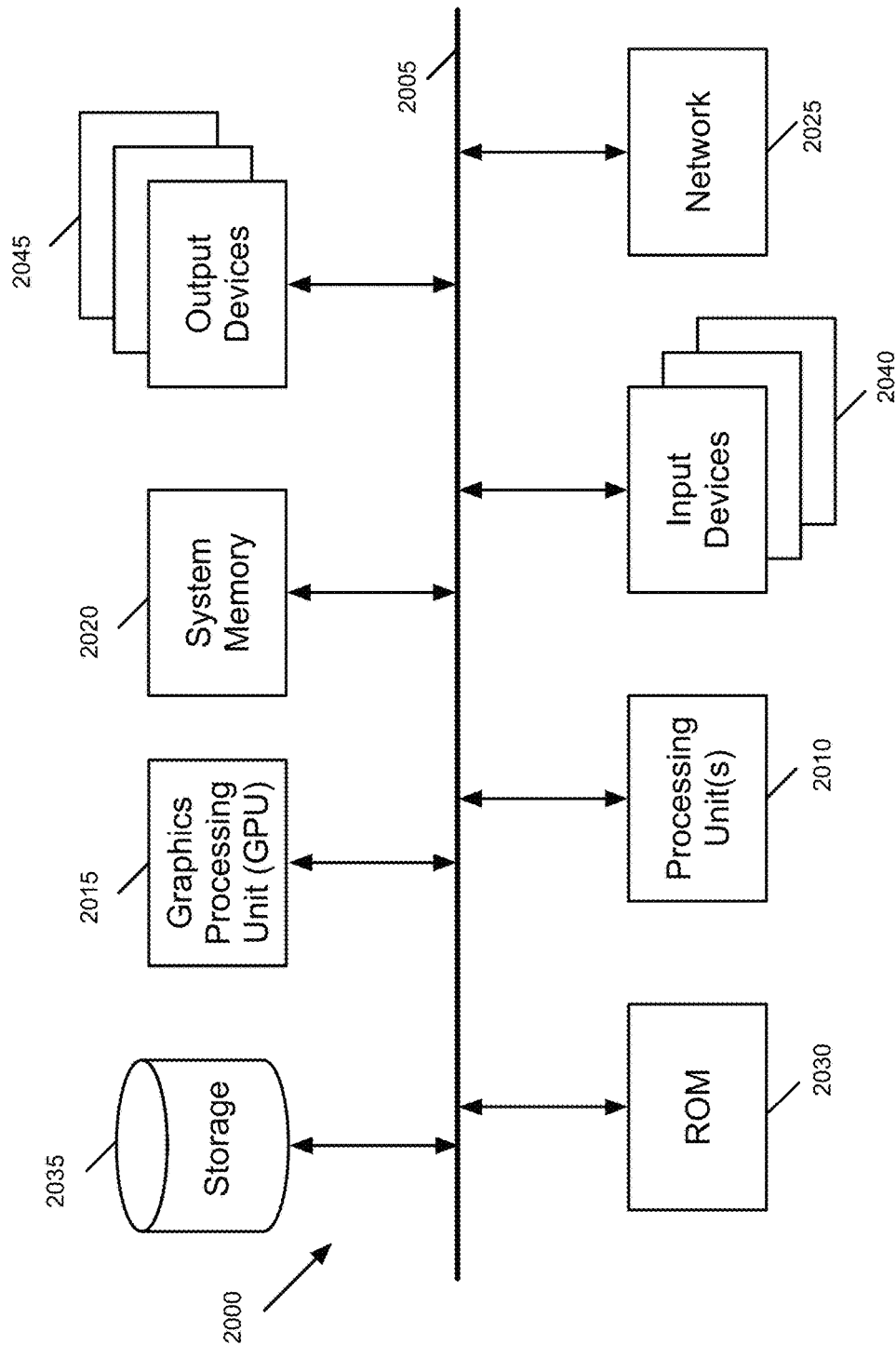
FIG. 20 conceptually illustrates an electronic system with which some embodiments of the invention are implemented.

FIG. 20 conceptually illustrates an electronic system 2000 with which some embodiments of the invention are implemented. The electronic system 2000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2000 includes a bus 2005, processing unit(s) 2010, a graphics processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2015, the system memory 2020, and the permanent storage device 2035.

From these various memory units, the processing unit(s) 2010 retrieves instructions to execute and data to process in order to execute the processes of the invention. The processing unit(s) may be a single processor or a multi-core processor in different embodiments. Some instructions are passed to and executed by the GPU 2015. The GPU 2015 can offload various computations or complement the image processing provided by the processing unit(s) 2010.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash memory device, etc., and its corresponding disk drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor needs at runtime. In some embodiments, the invention's processes are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alphanumeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3A-3C, 12, and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of providing a unified software update center for a device having one or more processors, memory, and a device display, the method comprising:

receiving data for a set of available system software updates, wherein the set of available system software updates comprises a set of available security system software updates and a set of available non-security system software updates, and wherein the data for the set of available system software updates includes first metadata that specifies a first delay value for auto-installation of a first security system software update of the set of available security system software updates;

receiving data for a set of available application software; and after receiving the data for the set of available system software updates and the available application software updates, concurrently displaying on separate areas on the device display:

content identifying the set of available security system software updates that includes a first countdown, which is based on the first delay value and current date and time, and that is configured to decrement from the current date and time to a date and time for auto-installation of the first security system software update, wherein the first countdown is displayed without regard to whether the set of available security system software updates include a security system software update that requires a system restart, content identifying the set of available non-security system software updates that is displayed without a representation of a countdown, and content identifying the set of available application software updates.

2. The method of claim 1, wherein the set of available security system software updates comprises a plurality of available security system software updates, and the method further comprises:

receiving a selection of a single selection tool for installing the plurality of available security system software updates; and in response to the selection, installing the plurality of available security system software updates without installing any non-security system software updates and any application software updates.

3. The method of claim 1 further comprising:

receiving a selection of a single selection tool for installing all available software updates; and in response to receiving the selection, installing all available security system software updates.

4. The method of claim 1 further comprising:

receiving a frame, a menu bar, and a title from an application software update server; and displaying the received frame, menu bar, and the title on a page comprising the concurrently displayed available security system software, non-security system software, and application software updates.

5. The method of claim 1, wherein the set of available security system software updates comprises one or more critical security system software updates and one or more non-critical security system software updates, and the method further comprises displaying the critical security system software updates with a first color and displaying the non-critical security software updates with a second color to visually identify the critical security software updates.

6. The method of claim 1 further comprising:

automatically sending requests at a first frequency to a system software update server for available critical security system software updates; and automatically sending requests at a second frequency to the system software update server for available non-critical security system software updates and the available non-security system software-updates, the first frequency higher than the second frequency.

7. The method of claim 1, wherein the content identifying the set of available security system software updates includes a second countdown for auto-installation of a second security system software update that is distinct from the first security system software update, wherein a current value of the second countdown for the second security system software update is greater than a current value of the first countdown for the first security system software update, and wherein the method includes:

in accordance with a determination that the current value of the first countdown for the first security system software update has reached zero, and while the current value of the second countdown for the second security system software update is greater than zero:

automatically installing the first security system software update and the second security system software update.

8. The method of claim 1, wherein the first delay value is concurrently displayed on the device display with the first countdown.

9. The method of claim 1, further comprising:

determining a current value of the first countdown;

in accordance with a determination that the current value of the first countdown has reached zero, displaying a notification to alert a user of the first security system software update, wherein the notification cannot easily be dismissed until the first security system software update is installed.

10. A non-transitory machine readable medium storing a program for providing a unified software update center for a device having a device display, the program executable by at least one processing unit, and the program comprising sets of instructions for:

receiving data for a set of available security system software updates, wherein the set of available system software comprises a set of available security system software updates and a set of available non-security system software updates, and wherein the data for the set of available system software updates includes first metadata that specifies a first delay value for auto-installation of a first security system software update of the set of available security system software updates;

receiving data for a set of available application software updates; and after receiving the data for the set of available system software updates and the available application software updates, concurrently displaying on separate areas of the device display:

content identifying the set of available security system software updates that includes a first countdown, which is based on the first delay value and current date and time, and that is configured to decrement from the current date and time to a date and time for auto-installation of the first security system software update, wherein the first countdown is displayed without regard to whether the set of available security system software updates include a security system software update that requires a system restart, content identifying the set of available non-security system software updates that is displayed without a representation of a countdown, and content identifying the set of available application software updates.

11. The non-transitory machine readable medium of claim 10, wherein the set of available security system software updates comprises a plurality of available security system software updates, and the program further comprises sets of instructions for:

receiving a selection of a single selection tool for installing the plurality of available security system software updates; and installing, in response to the selection, the plurality of available security system software updates without installing any non-security software updates and any application software updates.

12. The non-transitory machine readable medium of claim 10, the program further comprising sets of instructions for:
receiving a selection of a single selection tool for installing all available software updates; and
installing, in response to receiving the selection, all available security system software updates.

13. The non-transitory machine readable medium of claim 10, the program further comprising sets of instructions for:
receiving a frame, a menu bar, and a title from an application software update server; and
displaying the received frame, menu bar, and the title on a page comprising the concurrently displayed available security system software, non-security system software, and application software updates.

14. The non-transitory machine readable medium of claim 10, wherein the set of available security system updates comprises one or more critical security system software updates and one or more non-critical security system software updates, and the program further comprises a set of instructions for displaying the critical security system software updates with a first color and displaying the non-critical security software updates with a second color to visually identify the critical security software updates.

15. The non-transitory machine readable medium of claim 10, the program further comprising sets of instructions for:
automatically sending requests at a first frequency to a system software update server for available critical security system software updates; and
automatically sending requests at a second frequency to the system software update server for available non-critical security system software updates and the available non-security system software-updates, the first frequency higher than the second frequency.

16. The non-transitory machine readable medium of claim 10, wherein the rendered content identifying the set of available security system software updates includes a second countdown for auto-installation of a second security system software update that is distinct from the first security system software update, wherein a current value of the second countdown for the second security system software update is greater than a current value of the first countdown for the first security system software update, and wherein the program further comprises sets of instructions for:
in accordance with a determination that the current value of the first countdown for the first security system software update has reached zero, and while the current value of the second countdown for the second security system software update is greater than zero:
automatically installing the first security system software update and the second security system software update.

17. A device, comprising:
a device display;
one or more processors;
memory storing a program for providing a unified software update center for the device, the program executable by the one or more processors, the program comprising sets of instructions for:
receiving data for a set of available security system software updates, wherein the set of available system software comprises a set of available security system software updates and a set of available non-security system software updates, and wherein the data for the set of available system software updates includes first metadata that specifies a first delay value for auto-installation of a first security system software update of the set of available security system software updates;
receiving data for a set of available application software updates; and
after receiving the data for the set of available system software updates and the available application software updates, concurrently displaying on separate areas of the device display:
content identifying the set of available security system software updates that includes a first countdown, which is based on the first delay value and current date and time, and that is configured to decrement from the current date and time to a date and time for auto-installation of the first security system software update, wherein the first countdown is displayed without regard to whether the set of available security system software updates include a security system software update that requires a system restart,
content identifying the set of available non-security system software updates that is displayed without a representation of a countdown, and
content identifying the set of available application software updates.

18. The device of claim 17, wherein the set of available security system software updates comprises a plurality of available security system software updates, and the program further comprises sets of instructions for:
receiving a selection of a single selection tool for installing the plurality of available security system software updates; and
in response to the selection, installing the plurality of available security system software updates without installing any non-security system software updates and any application software updates.

19. The device of claim 17, wherein the program further comprises sets of instructions for:
receiving a selection of a single selection tool for installing all available software updates; and
in response to receiving the selection, installing all available security system software updates.

20. The device of claim 17, wherein the program further comprises sets of instructions for:
receiving a frame, a menu bar, and a title from an application software update server; and
displaying the received frame, menu bar, and the title on a page comprising the concurrently displayed available security system software, non-security system software, and application software updates.

21. The device of claim 17, wherein the set of available security system software updates comprises one or more critical security system software updates and one or more non-critical security system software updates and wherein the program further comprising sets of instructions for:
displaying the critical security system software updates with a first color and displaying the non-critical security software updates with a second color to visually identify the critical security software updates.

22. The device of claim 17, wherein the program further comprising sets of instructions for:

automatically sending requests at a first frequency to the system software update server for available critical security system software updates; and automatically sending requests at a second frequency to the system software update server for available non-critical security system software updates and the available non-security system software updates, the first frequency higher than the second frequency.

23. The device of claim 17, wherein the rendered content identifying the set of available security system software updates includes a second countdown for auto-installation of a second security system software update that is distinct from the first security system software update, wherein a current value of the second countdown for the second security system software update is greater than a current value of the first countdown for the first security system software update, and wherein the program further comprises sets of instructions for:

in accordance with a determination that the current value of the first countdown for the first security system software update has reached zero, and while the current value of the second countdown for the second security system software update is greater than zero:

automatically installing the first security system software update and the second security system software update.

* * * * *